United States Patent
Johnson

(10) Patent No.: US 7,924,210 B2
(45) Date of Patent: Apr. 12, 2011

(54) SYSTEM, METHOD, AND APPARATUS FOR REMOTE MEASUREMENT OF TERRESTRIAL BIOMASS

(75) Inventor: Patrick W Johnson, Jefferson, MD (US)

(73) Assignee: Zimmerman Associates, Inc., Fairfax, VA (US)

( * ) Notice: Subject to any disclaimer, the term of this patent is extended or adjusted under 35 U.S.C. 154(b) by 169 days.

(21) Appl. No.: 11/990,505

(22) PCT Filed: Jun. 28, 2006

(86) PCT No.: PCT/US2006/025270
§ 371 (c)(1),
(2), (4) Date: Feb. 15, 2008

(87) PCT Pub. No.: WO2008/054348
PCT Pub. Date: May 8, 2008

(65) Prior Publication Data
US 2010/0225531 A1 Sep. 9, 2010

Related U.S. Application Data

(60) Provisional application No. 60/810,158, filed on Jun. 2, 2006.

(51) Int. Cl.
*G01S 13/89* (2006.01)
(52) U.S. Cl. .......... 342/25 A; 342/54; 342/123; 342/191
(58) Field of Classification Search ........... 342/25 R, 342/25 A–25 F, 52, 54, 123, 190–194
See application file for complete search history.

(56) References Cited

U.S. PATENT DOCUMENTS

| | | | |
|---|---|---|---|
| 5,552,787 A * | 9/1996 | Schuler et al. | 342/25 A |
| 5,886,662 A | 3/1999 | Johnson | |
| 6,384,766 B1 | 5/2002 | Ulander | |
| 6,653,971 B1* | 11/2003 | Guice et al. | 342/54 |
| 6,850,183 B2* | 2/2005 | Reeves et al. | 342/22 |
| 6,853,328 B1* | 2/2005 | Guice et al. | 342/54 |
| 6,894,637 B2* | 5/2005 | Moreira et al. | 342/22 |

(Continued)

OTHER PUBLICATIONS dos Santos, J.R.; Araujo, L.S.; Freitas, C.C.; Sant'Anna, S.J.S.; Dutra, L.V.; Mura, J.C.; Gama, F.F.; Filho, P.H.; , "Inventory of forest biomass in Brazilian Amazon: a local approach using airborne P-band SAR data," Geoscience and Remote Sensing Symposium, 2001. IGARSS '01. IEEE 2001 International , vol. 2, No., pp. 786-788 vol. 2, 2001.*

(Continued)

*Primary Examiner* — John B Sotomayor
(74) *Attorney, Agent, or Firm* — Nixon & Vanderhye P.C.

(57) ABSTRACT

A system, method, and/or apparatus for remote measurement of terrestrial biomass contained in vegetative elements, such as large tree boles or trunks present in an area of interest, are provided. The method includes providing an airborne VHF radar system in combination with a LiDAR system, overflying the area of interest while directing energy toward the area of interest, using the VHF radar system to collect backscatter data from the trees as a function of incidence angle and frequency, and determining a magnitude of the biomass from the backscatter data and data from the laser radar system for each radar resolution cell. A biomass map is generated showing the magnitude of the biomass of the vegetative elements as a function of location on the map by using each resolution cell as a unique location thereon. In certain preferred embodiments, a single frequency is used with a linear array antenna.

24 Claims, 18 Drawing Sheets

U.S. PATENT DOCUMENTS

| | | | |
|---|---|---|---|
| 7,127,348 B2 * | 10/2006 | Smitherman et al. | 701/208 |
| 7,187,452 B2 * | 3/2007 | Jupp et al. | 356/501 |
| 7,298,869 B1 * | 11/2007 | Abernathy | 382/108 |
| 7,479,918 B2 * | 1/2009 | Johnson et al. | 342/22 |
| 2003/0122700 A1 * | 7/2003 | Moreira et al. | 342/25 |

OTHER PUBLICATIONS

Melon, P.; Martinez, J.M.; Le Toan, T.; Ulander, L.M.H.; Beaudoin, A.; , "On the retrieving of forest stem volume from VHF SAR data: observation and modeling," Geoscience and Remote Sensing, IEEE Transactions on , vol. 39, No. 11, pp. 2364-2372, Nov 2001.*

Fransson, J.E.S.; WaLter, F.; Ulander, L.M.H.; , "Estimation of forest parameters using CARABAS-II VHF SAR data," Geoscience and Remote Sensing, IEEE Transactions on , vol. 38, No. 2, pp. 720-727, Mar. 2000.*

Hoekman, D.H.; Quiriones, M.J.; , "Land cover type and biomass classification using AirSAR data for evaluation of monitoring scenarios in the Colombian Amazon," Geoscience and Remote Sensing, IEEE Transactions on , vol. 38, No. 2, pp. 685-696, Mar. 2000.*

G. Smith and L. M. H. Ulander, "A Model Relating VHF-Band Backscatter to Stem Volume of Coniferous Boreal Forest," IEEE Transactions on Geoscience and Remote Sensing, vol. 38, No. 02, p. 728, 2001.

Israelsson, H., Ulander, L.M.H., Askne, J.I.H., Fransson, J.E.S., Frelind, P.O., Gustavsson, A., and H. Hellsten, "Retrieval of Forest Stem Volume using VHF SAR," IEEE Transactions on Geoscience and Remote Sensing, vol. 35, p. 36-40, 1997.

J. E. S. Fransson, F. Walter, and L. M. H. Ulander, "Estimation of Forest Parameters Using CARABAS-II VHF SAR Data," IEEE Transactions on Geoscience and Remote Sensing, vol. 38, No. 02, p. 720, 2001.

J. R. G. Townshend, C. O. Justice, D. Skole, J. P. Malingreau, J. Cihlar, P. Teillet, F. Sadowski, S. Ruttenberg, "The 1 km Resolution Global Data Set—Needs Of The International Geosphere Biosphere Program," International Journal Of Remote Sensing, 15 (17): 3417-3441, Nov. 20 1994.

L. A. Bessette, S, Ayasli. "Ultra-wideband P-3 and CARABAS II foliage attenuation and backscatter analysis." *Proceedings of the 2001 IEEE radar conference*, pp. 357-362, 2001.

M. C. Dobson, "Forest information from synthetic aperture radar," Journal Of Forestry, 98 (6): 41-43, Jun. 2000.

M. C. Dobson, et al, "Dependence of Radar Backscatter on Conifrerous Forest Biomass", IEEE Transactions on Geoscience and Remote Sensing, vol. 30(2). p. 412-414, 1992.

M. L. Imhoff, "A Theoretical Analysis of the Effect of Forest Structure on Synthetic Aperture Radar Backscatter and the Remote Sensing of Biomass", *IEEE Transactions on Geoscience and Remote Sensing*, vol. 33, No. 2, Mar. 1995.

M. L. Imhoff, "Radar backscatter and biomass saturation: ramifications for global biomass inventory," IEEE Transactions on Geoscience and Remote Sensing, vol. 33, No. 2, pp. 510-518, 1995.

M. L. Imhoff, P.W. Johnson et al, "BioSAR: An Inexpensive Airborne VHF Multiband SAR System for Vegetation Biomass Measurement", IEEE Transactions on Geoscience and Remote Sensing, vol. 38(3). p. 1458-1462, May 2000.

M. L. Imhoff, S. Carson, P.W. Johnson. "A low frequency radar experiment for vegetation biomass measurement," IEEE Transactions on Geoscience and Remote Sensing, vol. 36, No. 6, Nov. 1998.

Nelson, R., M. Valenti, A. Short, and C. Keller. A Multiple Resource Inventory of Delaware Using Airborne Laser Data. BioScience 53(10): 981-992. 2003b.

R. B. Myneni, J. Dong, C. J. Tucker, R. K. Kaufmann, P. E. Kauppi, J. Liski, L. Zhou, V. Alexeyev, M. K. Hughes, "A large carbon sink in the woody biomass of Northern forests," Proceedings of the National Academy of Sciences Of The United States of America, (26): 14784-14789, Dec. 18 2001.

R. Condit, P. S. Ashton, N. Manokaran, J. V. LaFrankie, S. P. Hubbell, and R. B. Foster, "Dynamics of the forest communities at Pasoh and Barro Colorado: comparing two 50-ha plots," *Philosophical Transactions Of The Royal Society Of London Series B-Biological Sciences*, 354: (1391), pp. 1739-1748, Nov. 29 1999.

T. A. LaToan, J. Beaudoin, J. Riom, and D. Guyon. "Relating Forest Biomass to SAR Data". IEEE Transactions omn Geoscience and Remote Sensing, vol. 30(2) p. 403-411. 1992.

Y. A. Hussin, R.M.Reich, and R.M. Hoffer, "Estimating Slash Pine Biomass Using Radar Backscatter", IEEE Transactions on Geoscience and Remote Sensing, vol. 29(3). p. 427-431, 1991.

* cited by examiner

SYSTEM, METHOD, AND APPARATUS FOR REMOTE MEASUREMENT OF TERRESTRIAL BIOMASS

CROSS-REFERENCE TO RELATED APPLICATIONS

This application is the U.S. national phase of International Application No. PCT/US2006/025270, filed 28 Jun. 2006, which designated the U.S. and claims priority to U.S. Provisional Application No. 60/810,158, filed 2 Jun. 2006, the entire contents of these applications are hereby incorporated by reference.

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of Grant No. DE-FG02-04ER84127 awarded by the Department of Energy.

FIELD

The present invention relates to a system, method, and/or apparatus which enables the gathering of data from an airborne platform to construct a map of a surface area which indicates the terrestrial biomass resident in trunks of large trees, crops, vegetative elements, or the like present on the surface area. More particularly, the present invention provides terrestrial biomass information for rain forests or the like which are concealed to other known detection and measurement methods and devices by a thick canopy of small branches and leaves. The invention enables a map to be generated which indicates the biomass and/or embedded carbon of the vegetative elements as a function of location on the map.

BACKGROUND AND SUMMARY

The instant invention was designed and developed to meet a need which exists to measure the biomass contained in the tree trunks or the like present in the world's great rain forests. The ability for any sensor or combination of sensors to measure carbon to an accuracy of 1 ton per hectare, or biomass to 2 tons per hectare, in an absolute method as compared with the existing ground truth is probably not possible. This is due to the currently available methods of determining ground truth. The state of the art in ground truth measurement accuracy is optimistically +/−10-20%. With this much expected variation in ground truth, the ability for any sensor to demonstrate an absolute accuracy of 1 ton per hectare is not possible relative to manually obtained ground truth.

Yet, the remote detection of the above ground component of forest biomass is one of the primary goals of scientists interested in Earth's carbon cycle. More recently, as a consequence of international environmental treaties, methods for accurately measuring biomass and carbon are being sought by both policy makers and commodity traders. The remote sensing community has responded to the challenge by taking diverse observational approaches including optical and multispectral imaging, laser altimetry, and synthetic aperture radar sensing. Because of the difficulty in penetrating high volume and structurally complex canopies commonly found in tropical rainforests using radars operating in the 440 to 10,000 MHz range, there is increasing interest in exploring the use of VHF radar (primarily 20 to 120 MHz) approaches for measuring biomass in heavy forest stands. VHF radars may also have potential for exploring the below ground component of biomass and possibly soil factors important in carbon sequestration and flux.

Previous experiments have shown that VHF frequencies have potential for measuring forest biomass in dense forests. The results from an in situ field experiment showed that frequencies below 120 MHz were required to achieve good discrimination between two forests of similar species composition having very different biomass densities (89 and 300+ tons/ha of above-ground dry biomass respectively). Another study describes results from the 20-90 MHz CARABAS system where reasonably accurate biomass estimates could be made in forests ranging from 100 to 300 tons/ha. As of yet, no VHF signal saturation limit with respect to biomass has been identified.

To further explore the potential of VHF radar for biomass measurement, a VHF system was specifically designed to survey terrestrial biomass in forest stands above 100 tons/ha at a rate of 30 square miles per day. This system is disclosed in U.S. Pat. No. 5,886,662, to Johnson, the entire contents of which are incorporated herein by reference. The instrument was flown in the United States in 1997 and in Central America in 1998, and in three separate states during July 2003. The Central American deployment used the NASA C-130 aircraft for a series of flights designed to test several instruments for biomass retrieval and structural analysis in tropical forests. The sensor was flown over eleven different forest study sites within the protected watershed along the Panama Canal from the Atlantic coast to the Pacific. The instrument demonstrated a ∼+/−10% accuracy compared to ground truth as established by the Smithsonian Tropical Research Institute (STRI). Subsequent to this, the system according to the techniques disclosed in Johnson was installed in a Twin Otter and conducted flight surveys for the determination of carbon in terrestrial biomass in July 2003, and again in February 2005.

The basic BioSAR technology is described and defined in M. L. Imhoff, P. W. Johnson et al, "BioSAR: An Inexpensive Airborne VHF Multiband SAR System for Vegetation Biomass Measurement", IEEE Transactions on Geoscience and Remote Sensing, Vol. 38(3). p. 1458-1462, May 2000, the contents of which are incorporated herein by reference.

Briefly, an algorithm was developed to estimate vegetative biomass from VHF radar data. The data used as an input to this model came from the Swedish FOA CARABAS SAR system, and was collected in a DARPA FOPEN experiment.

The data was in the form of SAR images, so each pixel represented the normalized radar cross section (NRCS) of a 3-meter by 3-meter square. This measurement is a weighted average of the NRCS response across a frequency range from 20 to 90 MHz. Additionally, the SAR image formation process requires integration across an angle given by: where $\varnothing_{INT}$ is the integration angle, $$\phi_{INT} = \frac{\lambda}{2\delta_{cr}}\lambda$$

is the electromagnetic wavelength and $\delta_{cr}$ is the cross range resolution. For the CARABAS technique to achieve a 3-meter cross range resolution, the integration angle must be greater than 66 degrees. This has the effect of smearing both the incidence and azimuth angle responses.

This earlier experiment was originally designed to look at the issues associated with foliage penetration radar with military utility. Thus, the ground truth was not taken in a manner consistent with the standard techniques for biomass measurement. In particular, the ground truth data appears to represent the 10 closest trees, as opposed to the total number of trees in a given area. Tree density therefore had to be estimated.

A physics based, semi-empirical model was developed relating biomass to normalized radar cross section. This approach was chosen because the scattering geometry is complicated enough that an analytical model of reasonable accuracy is not tractable and, as of that time, there was insufficient data to construct an empirical model.

As the understanding of BioSAR has matured, this situation has changed, and empirical modeling is now based upon collected data and ground truth.

The resulting model relating biomass to normalized radar cross section is given by:

$$\text{Biomass} = b_1 * (\sigma_0 - a_1 10 \log_{10}(\cos\theta) + a_2 10 \log_{10}(k) - a_3 10 \log_{10}(|Rs|) + b_2) + b_3$$

where $a_1 - a_3$ and $b_1 - b_3$ are fit coefficients, $\sigma_a$ is the Normalized Radar Cross Section (NRCS) measurement in $dBm^2/cell$ area $dBm^2$, $\theta$ is the incidence angle of the specific angle bin developed by the Doppler processing, k is the electromagnetic wavenumber, and the surface reflection coefficient $R_s$ is given by:

$$R_s = \Gamma e^{-(\Delta\phi)^2}$$

$$\Delta\phi = \frac{4\pi\Delta h \sin(\theta)}{\lambda}$$

where $\theta$ is the incidence angle, $\Delta_h$ is the rms surface roughness of the underlying soil and $\lambda$ is the electromagnetic wavelength. These adjustments are made prior to incidence angle and frequency averaging.

The constants $a_1 - a_3$ and $b_1$ were originally derived from CARABAS data over a similar frequency range. These coefficients have been refined as a database of observed data was built. The wavelength, wavenumber, and the incidence angle are from BioSAR. Since soil moisture and surface roughness were not measured in situ, the surface reflection coefficient $R_s$ was assumed to be 0.5. The Panama field-based biomass estimate for a single site was used to determine a system-related calibration offset (coefficient $b_2$) as 3.5 dB. The coefficients $b_2$ and $b_3$ are used to calibrate for the observed dynamic range to allow for the variable soil moisture for the site being surveyed. The NRCS to biomass model used is an original equation. The NRCS for each pixel must be corrected for each frequency and for each look angle. The biomass model is then applied to all of the BioSAR signal data for the adjacent flight lines yielding biomass estimates for each 30 m by 300 m cell in the array.

The array is input to a geographic information system where a linear interpolation routine is applied to construct a 30×300 meter resolution biomass map of the transects across the survey area.

The NASA/Goddard Space Flight Center funded the construction and operation of the Portable Airborne Laser System (PALS), a small, compact, inexpensive LiDAR designed to sample extensive forest resources. As a proof-of-concept, the system was used to complete a multi-resource inventory of Delaware. Forest biomass, carbon, impervious surface area, open water area, and wildlife habitat estimates were derived from the airborne LiDAR measurements. Year 2000 PALS-based volume and biomass estimates were compared to 1999 US Forest Service—Forest Inventory and Analysis (FIA) county and state estimates. Statewide laser-based estimates of merchantable volume were within 5-15% of USFS-FIA state estimates; biomass estimates differed by 5-20%, depending on the model considered. The total above-ground dry biomass values were used to calculate a carbon budget for the state, by stratum within county.

The stability of the laser estimates as a function of sampling intensity were investigated by looking at the variability of county and state estimates using different combinations of laser flight lines. Empirical observations suggest that forest dry biomass and therefore, above-ground carbon, can be repeatedly estimated regionally (areas >5200 km2) within a range of ~7 t/ha (~3.5 t/ha C) with a systematic sample of flight lines spaced 6-8 km apart, e.g., a sampling intensity of 0.15 km/km2. The range of the biomass estimates will decrease as the size of the study area considered increases and as sampling intensity increases, e.g., as the spacing between systematic flight lines decreases. A study to discern the effects of increased sampling intensity, up to a sampling intensity of 1.0 km/km2 (equivalent to a one kilometer spacing between flight lines) is ongoing.

The PALS project was funded by NASA to investigate the sensor fusion of the PALS and Johnson's BioSAR data.

Johnson's BioSAR system, an airborne radar, and PALS, an airborne LiDAR, both specifically designed to measure forest biomass from low-altitude aircraft, were flown together aboard a Twin Otter over 30 selected sites in North Carolina. Collinear and coincident LiDAR and Radar data, along with video data were acquired. Refinements to the equations to predict above-ground biomass and carbon were developed separately for the LiDAR and Radar data sets to determine the accuracy, consistency, and variability of resultant biomass estimates.

It was expected that the combined LiDAR and Radar data can be used to estimate biomass more accurately than either instrument alone. Based upon this supposition, a multi-sensor platform and sampling scenario is offered in the instant invention which has the design goal of the detection of C changes of 1 t/ha over large areas. Such synergy is expected (though not yet documented) because the two instruments respond to different biophysical aspects of the forest target. The radar provides a volumetric return related to the total amount of large, woody material in the radar footprint. The laser, on the other hand, responds to changes in tree height and absolute above-ground level (AGL) of the aircraft. Expected improvements are, in fact realized by combining radar and laser data, then these improvements manifest themselves in the form of higher biomass estimation accuracy and decreased sampling (flight) costs.

Cost effective and accurate means to remotely determine aboveground standing biomass and the subsequent conversion to estimates of carbon stock are of critical need for both the scientific study of carbon cycle science and for commercial purposes in the private sector. The most viable technologies to obtain this data from aircraft or satellites are the active radar and LiDAR sensors. At present, there are no airborne or spaceborne radar systems capable of measuring terrestrial biomass in stands of over 100 tons/ha. Other systems do not address the direct measurement of biomass. The earlier Johnson system is the only US system available for civilian use that operates in the 100 MHz region and uses novel technology to mitigate electromagnetic interference and thus achieve NTIA and FCC approval. The instant invention provides modifications to the existing design of the original Johnson system for the fabrication of a new prototype with a design goal to measure increases of carbon fixation or sequestration by 1 tonne per hectare per year.

The instant invention could have a major impact on the current methods by which spatial information about forest biomass and forest carbon is obtained by both the public and private sectors. For example, current technologies utilize optical remote sensing techniques to determine vegetation cover types and information that may be locally-to-regionally conditioned by ancillary field observations. Also, field sampling strategies can be greatly enhanced and made much more accurate and cost effective. Both the public and private sector resource managers have a strong interest in reducing costs, improving efficiency, and increasing the timeliness and accuracy of geospatial information essential for decision making.

The development of larger-scale biomass estimation approaches ultimately depends on the accuracy of the smaller-scale technologies such as the approach disclosed herein. The technology disclosed herein also could lead to larger area coverage in regions where frequent biomass monitoring is required and currently not available from any airborne or spaceborne technique.

There also is significant commercial potential. The entire Forest Inventory Agency (FIA) operation could be expanded by orders of magnitude in scope with very little increase in the field work overhead. There currently is a real lack of forest structure and biomass measurement instruments and the instant invention will have considerable appeal in many markets.

Existing biomass and carbon survey methods and technologies are slow, expensive and inexact. The instant invention offers a new technology which provides for the airborne remote sensing of biomass and carbon using a system comprising VHF radar, a laser radar system, and a video camera. Thus, it will be appreciated that new and improved biomass and carbon measurement techniques are required that will provide for the validation of technologies developed to enhance net long-term carbon sequestration in above ground terrestrial biomass.

The existing techniques disclosed by Johnson have been designed and demonstrated to measure biomass and carbon over large areas at a rate of about 30 square miles a day with a demonstrated accuracy of +/−15%. Commercial biomass and carbon survey services are now being offered at a cost of about $2.00 per acre.

The instant invention is a variant of the original Johnson techniques combined with a new laser radar system and a new large linear array radar antenna. Thus, the instant invention allows for a much more exact survey with a design goal of 3 square miles (777 ha) per day. One design goal for the measurement of the change of carbon loading for the proposed system is 1 tonne of C per hectare per year. That is, the instant invention may measure the increase of carbon fixation or sequestration per hectare per year.

The instant invention puts forth the premise that the techniques disclosed herein may, for example, measure the change in biomass and carbon over the period of one year. The instant invention may, for example, provide an estimate of actual biomass and carbon.

A design goal of the instant invention is to be able to determine the change in carbon load at a rate of one ton per hectare per year. A better measure of the accuracy of the proposed system is the ability to obtain and achieve reproducible estimates of biomass and carbon over a short time course, and then observe reproducible results over the same stands after a period of one year which will demonstrate the expected change in biomass and carbon loads.

In one aspect of the invention, the planned addition and combination with a new Airborne Laser System will provide for two independent sensors. These sensors will be collocated on the same aircraft and will observe the same field of view. The two sensors will provide separate streams of data that will be used individually and collectively in a sensor fusion implementation.

In another aspect of the invention, the primary factors of the technical approach involve the addition of a laser radar system, the changes and refinements of the computer algorithms, and a new and large linear array antenna which will significantly reduce the radar footprint on the ground and allow for smaller and more accurate resolution cells or pixels.

Certain exemplary embodiments provide methods of remote measurement of terrestrial biomass contained in vegetative elements present in an area of interest. Such methods may comprise providing an airborne VHF radar system in combination with an airborne laser radar system. They may further comprise overflying the area of interest while directing radar energy from the VHF radar system toward the area of interest, wherein a plurality of radar resolution cells are defined on the area of interest. The VHF radar system can be used to collect backscatter data from the radar energy as a function of incidence angle and frequency for each of the plurality of given radar resolution cells in the area of interest. The laser radar system can be used to determine above ground level data and height of the vegetative elements in each of the plurality of radar resolution cells. A magnitude of the biomass in the vegetative elements can be determined based at least in part on the backscatter data and data from the laser radar system for each of the plurality of radar resolution cells in the area of interest.

Certain other exemplary embodiments provide a method of remote measurement of terrestrial biomass contained in vegetative elements present in an area of interest. Such methods may comprise providing an airborne VHF radar system in combination with a laser radar system, the VHF radar system comprising a linear antenna array. Such methods may further comprise overflying the area of interest while directing radar energy from the VHF radar system toward the area of interest, wherein a plurality of radar resolution cells are defined on the area of interest. The VHF radar system can be used to collect backscatter data from the radar energy as a function of incidence angle and frequency for each of the plurality of given radar resolution cells in the area of interest. The laser radar system can be used to determine above ground level data and height of the vegetative elements in each of the plurality of radar resolution cells. A magnitude of the biomass in the vegetative elements can be determined based at least in part on the backscatter data and data from the laser radar system for each of the plurality of radar resolution cells in the area of interest.

In certain non-limiting embodiments, the VHF radar system may be operably connected to an aircraft having two wings, with each wing having a wingtip, and the VHF radar system may extend from wingtip-to-wingtip. The VHF radar system may operate on a single frequency, or multiple frequencies (e.g. six frequencies). In certain non-limiting embodiments, the methods of may further comprise generating a map of the area of interest, the map showing at least the magnitude of the biomass of the vegetative elements as a function of location. Also, in some non-limiting embodiments, the methods may further comprise recording video and/or audio while overflying the area of interest.

In certain other exemplary embodiments, a system for remote measurement of terrestrial biomass contained in vegetative elements present in an area of interest is provided. Such systems may comprise a VHF radar system operable to be connected to an airborne object in a down-looking manner, the VHF radar system being further operable to direct radar energy toward the area of interest and to collect backscatter data as a function of incidence angle and frequency for each of a plurality of radar resolution cells defined on the area of interest. Such systems may include an airborne laser radar system operable to be connected to an airborne object in the down-looking manner, the airborne laser radar system being further operable to measure above ground level data and height of the vegetative elements in each of the plurality of radar resolution cells. Such systems also may include a processor operable to determine a magnitude of the biomass in the vegetative elements based at least in part on the backscatter data and data from the laser radar system for each of the plurality of radar resolution cells in the area of interest.

In yet other exemplary embodiments, a system for remote measurement of terrestrial biomass contained in vegetative elements present in an area of interest is provided. Such systems may comprise a VHF radar system operable to be connected to an airborne object in a down-looking manner, the VHF radar system being further operable to direct radar energy toward the area of interest and to collect backscatter data from the radar energy as a function of incidence angle and frequency for each of a plurality of radar resolution cells defined on the area of interest. Such systems may also include an airborne laser radar system operable to be connected to an airborne object in the down-looking manner, the airborne laser radar system being further operable to measure above ground level data and height of the vegetative elements in each of the plurality of radar resolution cells. Such systems may further comprise a processor operable to determine a magnitude of the biomass in the vegetative elements based at least in part on the backscatter data and data from the laser radar system for each of the plurality of radar resolution cells in the area of interest, wherein the VHF radar system comprises a linear antenna array.

In some non-limiting embodiments, the VHF radar system and the laser radar system are disposed so as to be collocated and collinear, and/or have the same field of view. In some non-limiting embodiments, the VHF radar system, the laser radar system, and/or the recorder are disposed so as to be collocated and collinear, and/or have the same field of view.

BRIEF DESCRIPTION OF THE DRAWINGS

These and other features and advantages will be better and more completely understood by reference to the following detailed description of exemplary illustrative embodiments in conjunction with the drawings, of which.

DETAILED DESCRIPTION

To determine the technical feasibility of the instant invention, a system according to the techniques disclosed by Johnson was used to survey selected stands of Weyerhaeuser pine plantations with biomass ranging in biomass from 0 (clear cut) to over 300 tons per acre. Thirty sites were flown with each site surveyed with a north-south run and an east-west run. The two legs were compared and were observed to be very similar. All sites were then flown on the next day with a repeat of the two legs per site procedure. All sites compared favorably from leg to leg and from day to day. The raw data has values from 0 to over 300 tons per acre which corresponds to the expected biomass values. The raw data has now been corrected for antenna gain, receiver sensitivity, and absolute altitude as determined by the laser radar. The estimated accuracy of this system is approximately +/−10-15% with typical $R^2$ values of approximately 0.96. The new linear array antenna and the addition of the new laser radar in the instant invention were thus expected to improve the accuracy and reproducibility of this feasibility test.

The existing instrument used in the feasibility test is a pulse-coherent radar system capable of collecting data in up to six frequencies between 80 and 120 MHz in a nadir (downward-looking) mode at low altitude (300 meters above ground level). Since the instrument operates in the same frequencies used by commercial radio and television, both the downward looking mode and the low operating altitude were designed to limit the system power requirements and diminish the possibility of interference to FM and TV receivers. It is a down-looking, non-imaging radar and is considerably different from side-looking imaging SAR systems.

Figure 1:
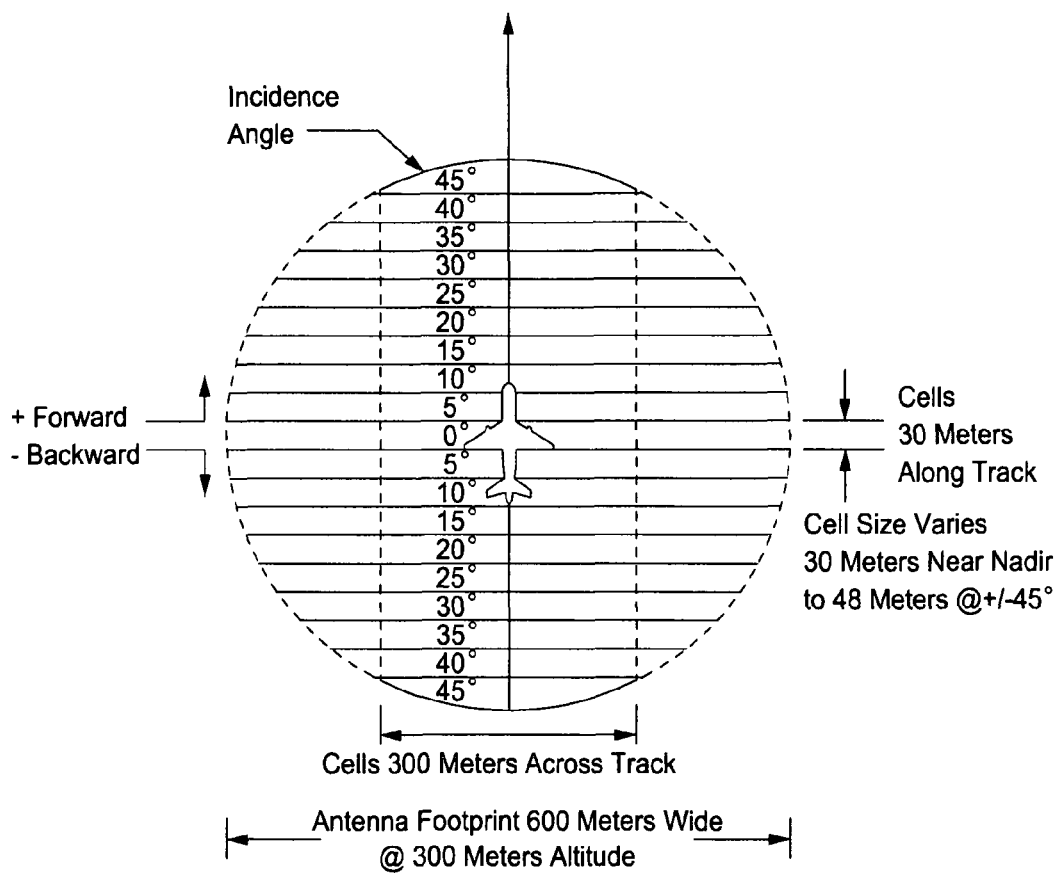
FIG. 1 is a diagram that shows how an antenna footprint is broken-down into cells by Doppler processing for analysis.

The instrument illuminates the ground directly beneath the aircraft along the flight line in a 600-meter wide swath. Doppler sorting is used to collect the radar signal in 5° incidence angle increments fore and aft of nadir. Radar response values are averaged together to provide a single response value at each of six frequencies for the 18 incidence angle bins (+/−5° through 45°) for each Doppler resolution cell. Nadir looking data (+/−2.5°) are discarded. The processed resolution cell is approximately 300 meters wide (across track) by 30 meters along track. The across-track dimension is limited by range gating to 300 mt. The along track dimension is achieved by the Doppler/SAR processing as shown in FIG. 1, which is a diagram that shows how an antenna footprint is broken-down into cells for analysis.

The polarization of the antenna is linear with the vertical element aligned with the flight path. The post-processed radar returns recorded by the system are the average power received at each frequency within each Doppler-sorted bin along track. In operation, the digitized radar returns, with GPS time and location data, are passed to the onboard PC-based computer/software system. Returns from directly under the aircraft and all other returns with a zero Doppler shift can be digitally cancelled from the resulting display. It will be appreciated that the nadir return data could also be used for soil moisture and soil penetration studies in future versions of the instrument.

One of the most important design considerations for this system was the potential for interference, as the operating frequency range contains both commercial TV and FM radio-broadcast stations. In order to minimize electromagnetic interference (EMI), a calibration run with the aircraft is made over the survey area at 1000 feet in altitude, followed by an RF environmental survey. During the internal calibration and environmental survey runs, the radar operates in a passive (receive-only) mode in order to observe and record frequencies between 80-120 MHz that are in use locally. All emergency, restricted frequencies and other 80-120 MHz frequencies observed in use are entered into a file of forbidden frequencies in the system computer and blocked from use. At the end of the environmental survey, six frequencies having the lowest signal and noise levels are identified and selected for radar operations.

The nominal receiver IF bandwidth is 2 MHz. The overall tuning strategy enables the selection of six non-interfering and relatively quiet frequencies that fit into empty FM broadcast band slots in the immediate area of operations. The waveform selected in a preferred embodiment is a narrow-band pulse waveform with a spectrum generated that is similar to a standard FM broadcast signal. In this manner, the majority of the EMI concerns, both on transmit and receive are minimized. The combination of the down-looking antenna, the frequency selection strategy, low altitude, and low power make the instrument almost invisible to other in-band receivers. This waveform and the data collection strategy were presented to the U.S. National Telecommunications and Information Administration (NTIA) and an experimental license to operate the sensor in the U.S. has been granted. A Special Temporary Authorization (STA) has also been granted from the FCC for the commercial operation of the instrument in the US.

It then became necessary to develop design approaches for the improved system of the instant invention. Previous VHF experimental radar systems for biomass observations have used multiple frequencies across the HF (3-30 MHz) and VHF (30-300 MHz) RF spectrum. In most experiments, one of only three types of waveforms has been used: pulse compression, stepped spectrum, or multiple narrowband RF signals. It will be appreciated, however, that other waveforms can be used if the system and computations are modified accordingly.

Pulse compression uses a linear frequency modulated chirp pulse to accomplish the compression of a relatively long pulse duration to achieve improved range resolution independent of pulse duration. A stepped spectrum waveform is similar in operation to a pulse compression waveform but cycles through the operating bandwidth in discrete steps. The operation is the same as with pulse compression and provides range resolution independent of pulse duration. The CARABAS radar system operates from 2-90 MHz and uses a stepped spectrum waveform. The DARPA FOPEN radar uses two radar systems, one UHF and one VHF, and employs both pulse compression and stepped spectrum waveforms. The operational system used in the feasibility study uses six narrowband frequencies across the FM spectrum carefully selected so as not to interfere with local broadcast stations.

When using pulse compression or stepped spectrum waveforms, large portions of the RF spectrum are required to allow the proper operation of the system. The pulse compression and stepped spectrum systems use a ~80-100 MHz of Chirp bandwidth to achieve the range resolution desired.

The earlier Johnson system uses six narrow band signals which occupy only a fraction of the bandwidth required by the other types of waveforms. The pulse compression and stepped spectrum signals can create electromagnetic interference (EMI) in the wide bands across which they transmit. The multiple narrowband system used in this technique has been demonstrated to operate without EMI when the operation frequencies have been carefully coordinated with all FM broadcast stations within a 65 mile radius of the area of operations.

The NTIA manages the frequency spectrum for government purposes and the FCC manages the RF spectrum for all commercial purposes. In dealings with the NTIA and the FCC, it has become apparent that no wideband system, such as the pulse compression and stepped spectrum systems will ever be licensed for commercial use because of the EMI issue. Thus, the earlier Johnson system is the only airborne remote sensor system for the measurement of biomass and carbon that is commercially available. The instant invention uses a similar frequency and data collection strategy to ensure FCC and NTIA approval.

The approach described above addresses the domestic issue of licensure. All countries manage their RF spectrum and are restrictive as to the permission for the use of unlicensed systems. The Worldwide Administrative Radio Conference (WARC) is the global organization that sets the standards and assigns the frequencies for RF spectrum use. The majority of developed countries are members of the WARC and carefully follow WARC guidelines. When NTIA and FCC licensure are approved by the US Federal Government, the license is usually and routinely honored by all other participants of WARC.

Next, it became necessary to develop design approaches for the laser radar system—e.g., adding an airborne laser to the existing instrument. Previously, the NASA PALS laser radar had been used in conjunction with earlier systems. The data collection algorithms of the instant invention needed to be revised to directly record the instantaneous laser radar AGL values and store them in a parallel file in the earlier system's data stores, as described below. Currently, the existing instrument and PALS laser radar files are compiled separately and conjoined later during post-processing; however, in other exemplary embodiments they could be compiled together eliminating the need for post-processing. In a preferred embodiment, the configuration and location and use of the new laser radar will be similar to the PALS laser radar.

Given the favorable results of these tests, a preliminary design for the fabrication of an airborne radar/laser remote sensing instrument for the detailed measurement of biomass and carbon in heavily wooded areas with biomass loading greater than 100 tons/ha was developed. The design goal was the measurement of biomass and carbon with reproducibility sufficient to observe a change in carbon loading of 1 ton per hectare per year.

The existing Johnson system design served as a point of departure. That system uses six frequencies and flies at 300 meters. In order to improve both the accuracy and the precision of the new system, the preliminary design for the instant invention addressed improvements in the hardware and software elements of the system and the procedures and protocols used for data collection. For example, a single frequency in the 80-120 MHz spectrum has been implemented instead of the six frequencies used by the earlier system. The use of a single frequency allows for a linear array antenna with significantly higher gain and is therefore preferred, though it will be appreciated that the six frequencies of the earlier system can be used in certain embodiments of the instant invention.

The preliminary design addressed all elements of the system, comprising the radar transmitter, receiver, and the new large linear array antenna. The changes in design required for the digital signal processor, data extraction and storage, the operational control and display of the system have been defined. This preliminary design, discussed below, is used for the fabrication of an airborne prototype which was installed and integrated into an airborne platform for demonstration and experimentation.

Similarly, the methods for collecting data have been studied and improved, as described below, based on the lessons learned from the previous flights and survey operations with the earlier system of Johnson. The results from the data collection studies were used to design experiments with the prototype to determine the optimal methods for data collection utilizing the radar and the laser individually and collectively in a sensor fusion configuration.

A first test run was made over North Carolina using the earlier Johnson system with algorithm and hardware changes to simulate the preset intention. Thirty sites were identified in collaboration with Weyerhaeuser to give a wide range of biomass values. The GPS waypoints for the center of each site were entered into the cockpit GPS display. The pilots were able to place the aircraft very close to the designated waypoint. Each site was 100 acres or larger and fairly rectangular in shape to ensure that the earlier system's eighty acre footprint was contained within the site.

A north-south run and an east-west run were flown for each site. All thirty sites were flown in one day and repeated on the next day. The plan here was to demonstrate the reproducibility of the data.

Figure 2:
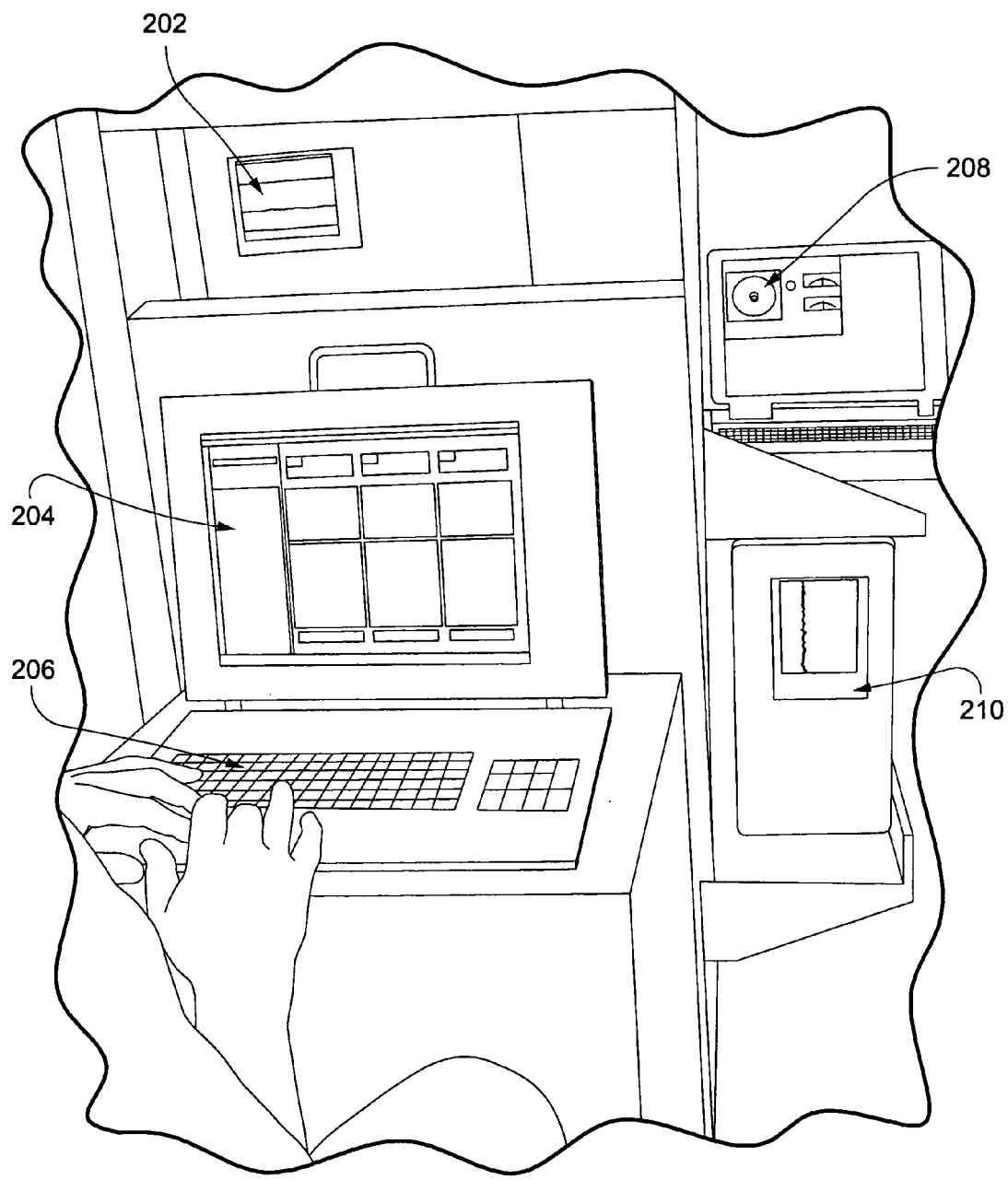
FIG. 2 shows an exemplary operator's station within a suitably-equipped aircraft.

FIG. 2 shows an exemplary operator's station within a suitably-equipped aircraft. Preferably, from the operator's station, every aspect of the instrument can be controlled and monitored. A four channel digital oscilloscope 202 displays the operations of four critical aspects of the system and can be seen above the operators graphical user interface (GUI) 204. The operator's keyboard 206 controls the radar and all of the associated equipment. A TV monitor (not shown) sits on the top of the rack and displays the output of the down looking video camera. The yellow circle is the display of an instrument 208 that records yaw, roll, and pitch. The instrument underneath is a spectrum analyzer 210 which displays the instantaneous power in the frequency spectrum. An on-board computer (not shown) is located behind the GUI 204, and a printer (not shown) is located under the computer. Several pieces of test gear are located below the printer.

Figure 2A:
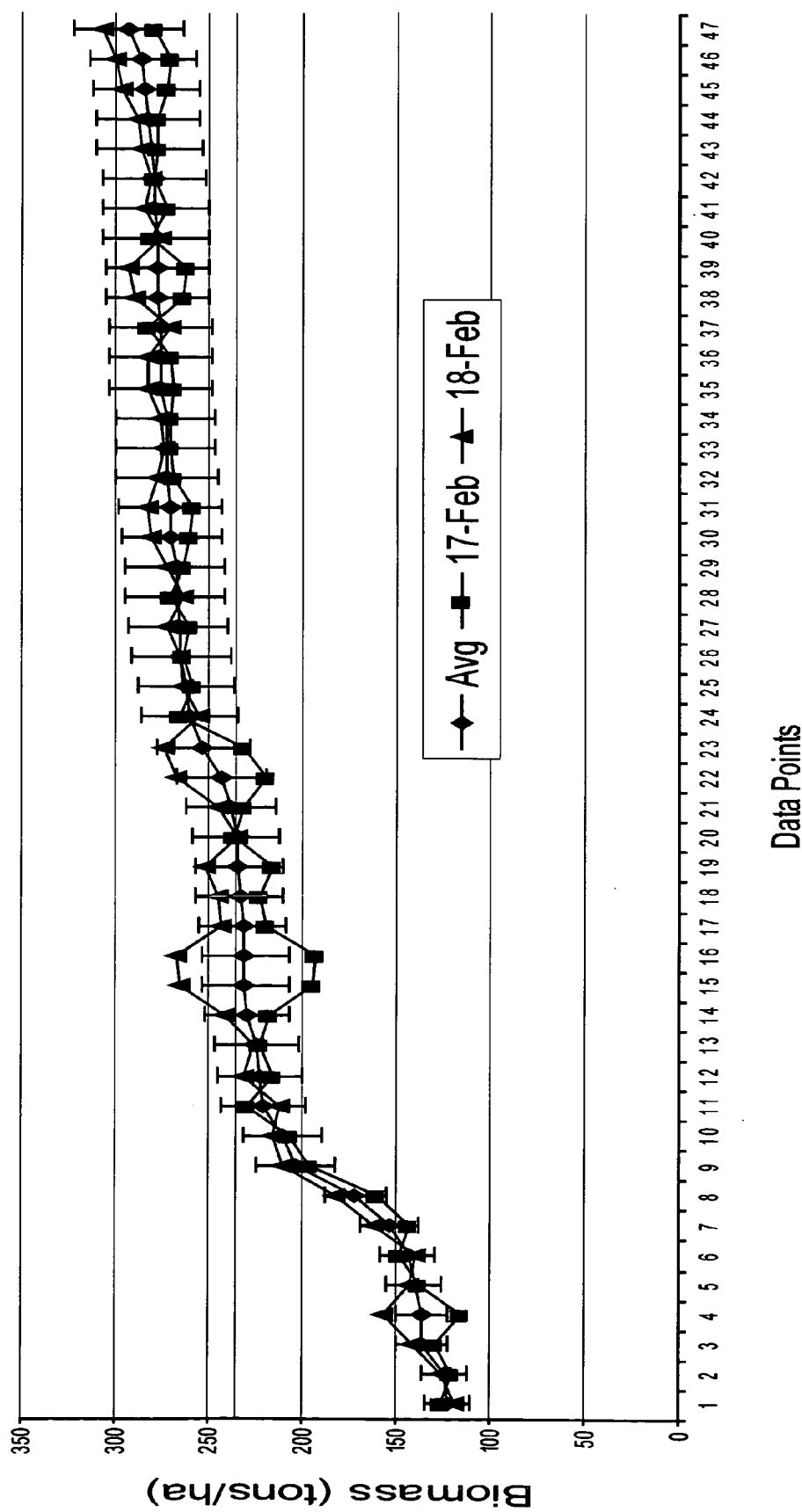
FIG. 2A is a chart showing exemplary reproducibility results for measurements taken on two consecutive days.
Figure 2B:
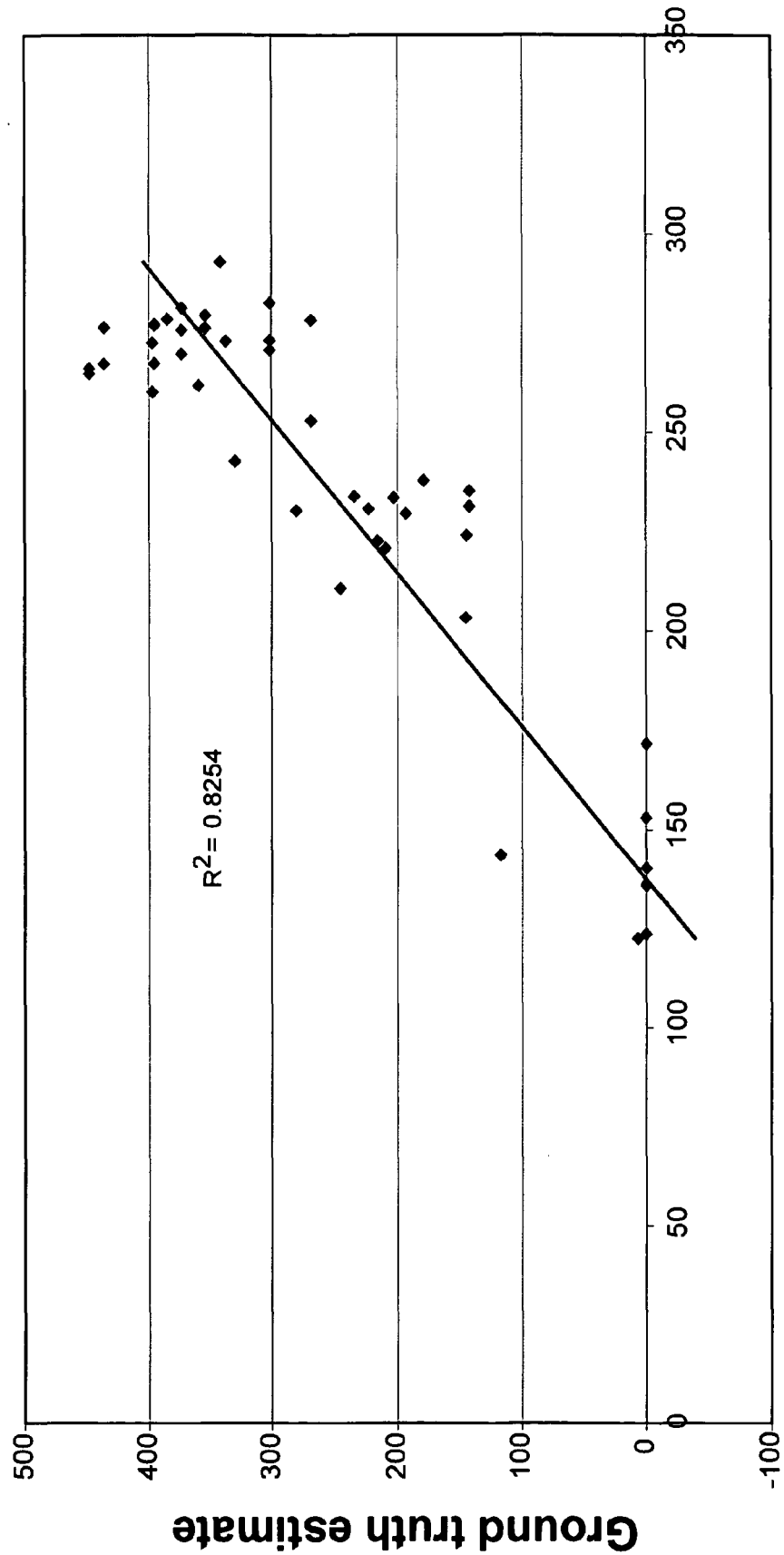
FIG. 2B is a chart comparing exemplary ground truth data with exemplary measurements taken by one embodiment developed in accordance with the present invention.

FIG. 2A is a chart showing exemplary reproducibility results for measurements taken on two consecutive days. FIG. 2B is a chart comparing exemplary ground truth data with exemplary measurements taken by one embodiment developed in accordance with the present invention. As can be seen from FIGS. 2A and 2B, the system is substantially internally consistent (e.g. data compare well across days), and the system is substantially consistent with ground truth data.

Figure 3:
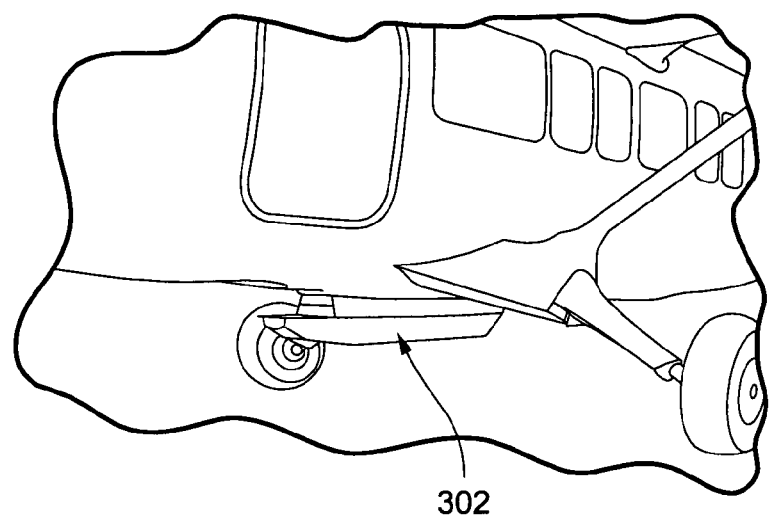
FIG. 3 shows an exemplary BioSAR antenna mounted to the fuselage of an aircraft.

FIG. 3 shows an exemplary BioSAR antenna 302 mounted to the fuselage of an airplane. The antenna is about 5 feet long, 18 inches wide, and six inches deep. It preferably is comprised of one large bowtie element mounted on a printed circuit board and covered with a fiberglass radome. Preferably, it is mounted on the bottom of the fuselage and looks directly down.

Figure 4:
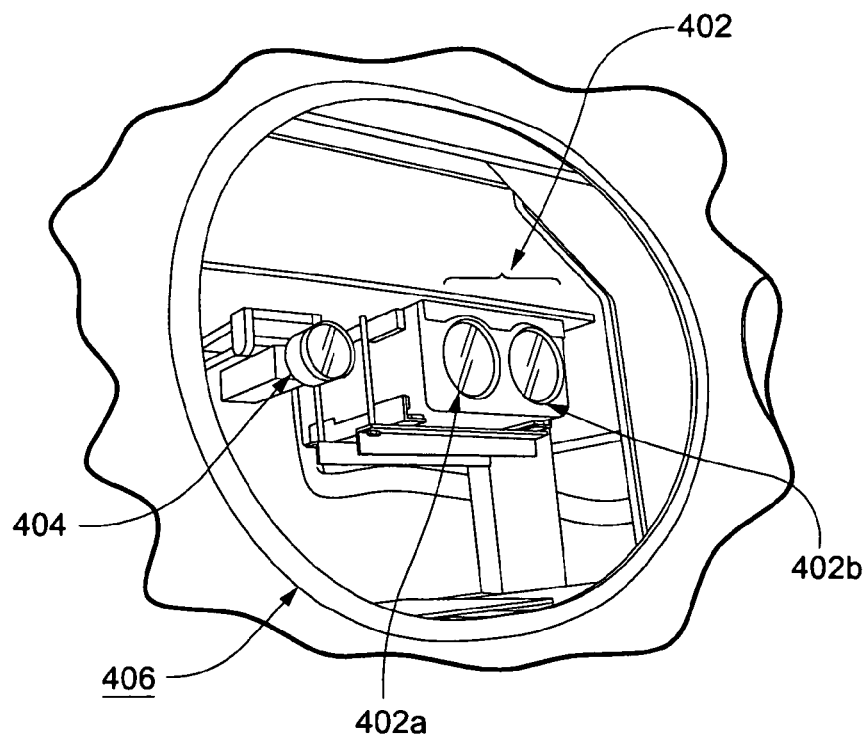
FIG. 4 shows an exemplary laser radar system and the collocated and collinear video camera.

FIG. 4 shows an exemplary laser radar system 402 and the collocated and collinear video camera 404. The infrared laser radar 402 uses two optical lenses 402a-b, one for transmit and the other for receive. The large hole 406 is in the bottom of the fuselage with the instruments mounted across the opening. The large opening is covered with a plate (not shown) in transit and removed for data taking operations.

Figure 5:
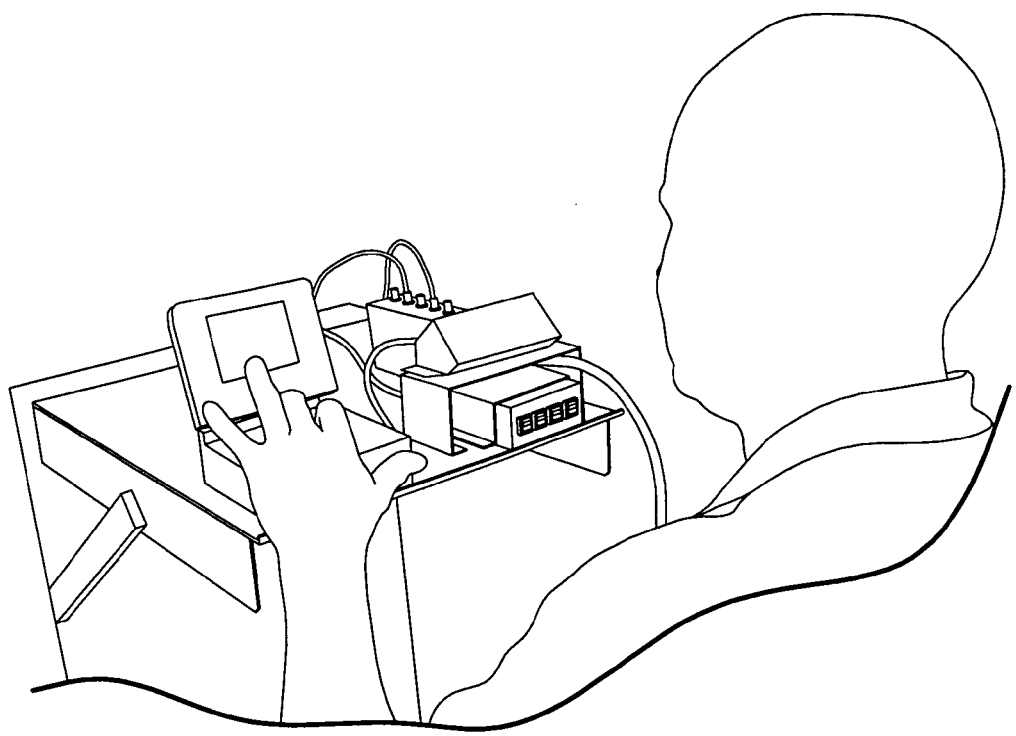
FIG. 5 shows an exemplary laser radar operator's station.

FIG. 5 shows an exemplary laser radar operator's station. A small video recorder 502 is shown mounted on the left of the shelf. The instrument to the right is a miniaturized titler 504 which imprints the video frames with GPS time and coordinates. The system also has an audio track (not shown) tied in to the intership communications system to record conversations and dialogue from the operator and crew, and to record the pilot's declarations of "on-top".

Figure 6:
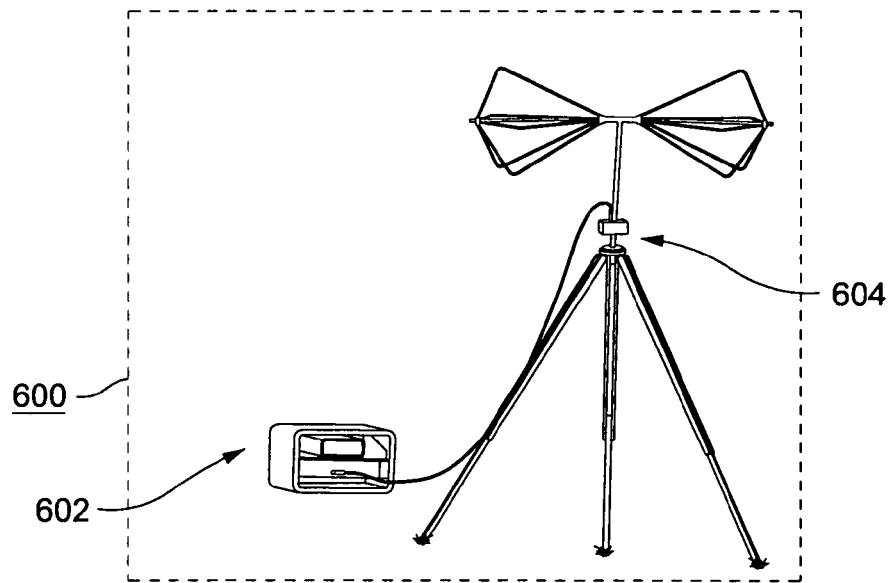
FIG. 6 shows an exemplary external calibration system.

FIG. 6 shows an exemplary external calibration system 600. This system is comprised of a very stable and sensitive signal generator (located in the case 602) that transmits a small signal representing the return from a 1 square meter normalized radar cross section (NRCS) target. The aircraft flies directly over this system and records the frequency and power received through the receiver for the calibration of the receiver. The other equipment in the system, shown in the case 602 close to the antenna 604, includes a sensitive frequency meter and a power meter to monitor exactly what the signal generator is transmitting. The antenna 604 is a specially calibrated antenna used for precision measurements of radiated and received power. The aircraft flies over the calibration station at the beginning and end of every 4 hour mission. The data from the settings and readings on the ground are passed up to the aircraft by the ground crew manning the calibration station.

Figure 13:
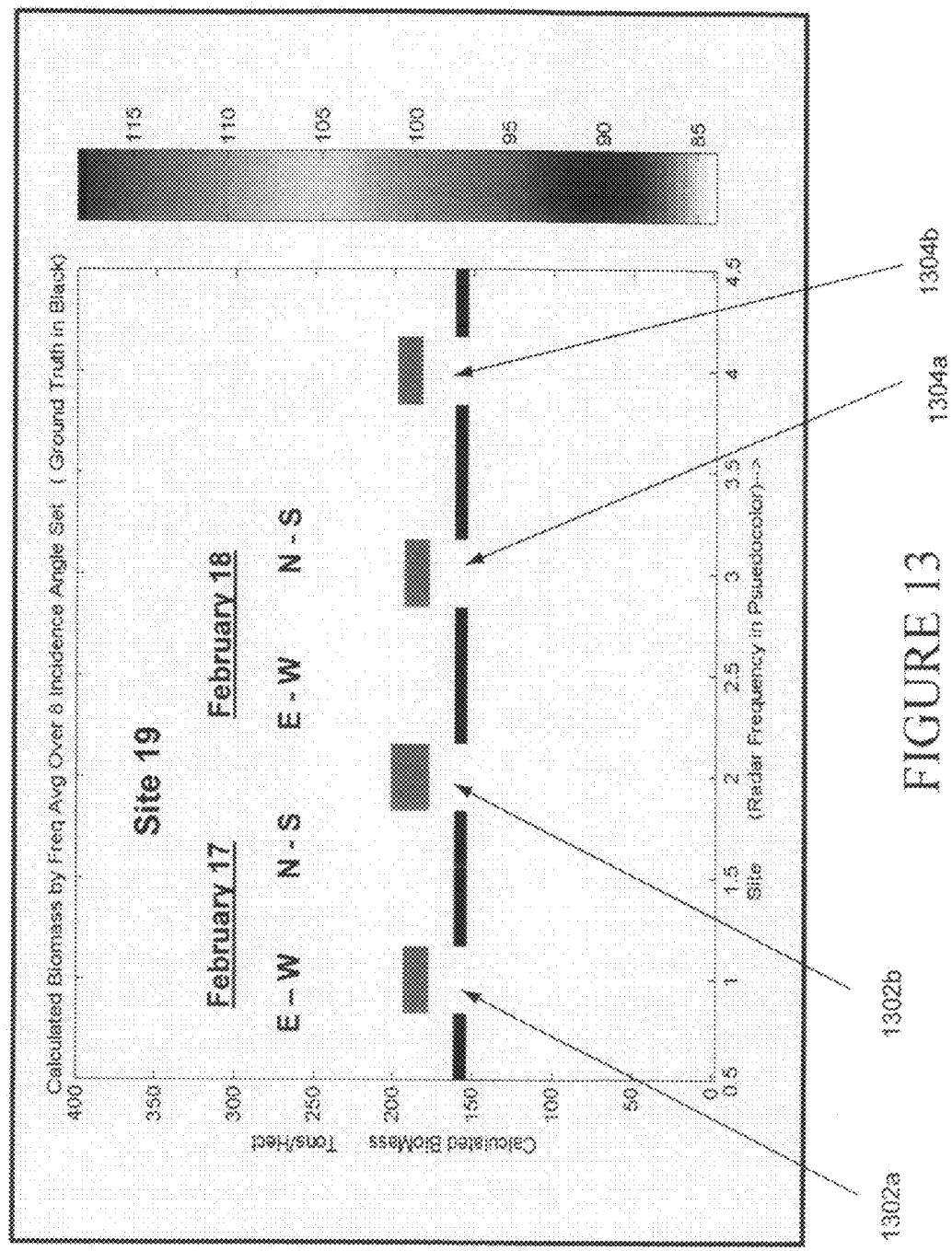
FIG. 13 shows the reduction of the data to biomass in tons per hectare for the four passes over the site on two consecutive days.
Figure 14:
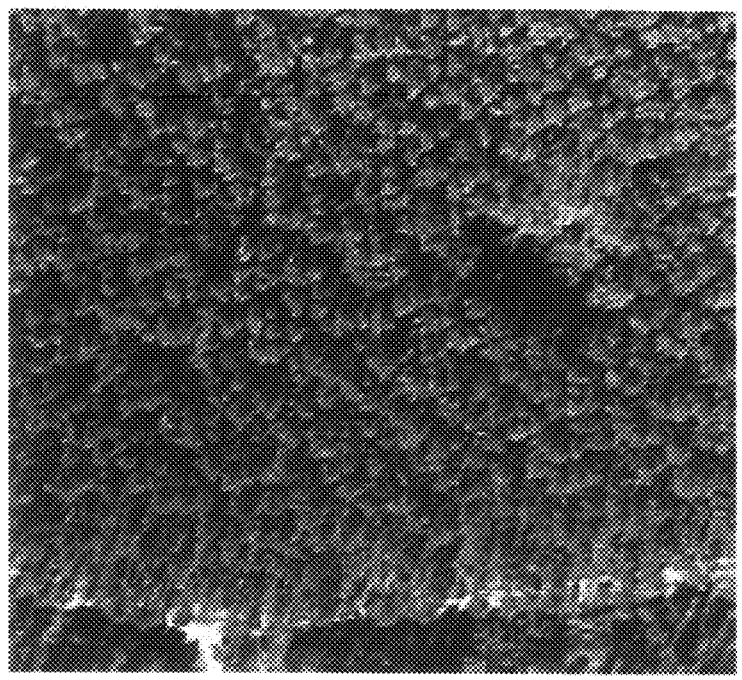
FIG. 14 is one of the frames from the video camera aboard the aircraft taken over Site 19.
Figure 15:
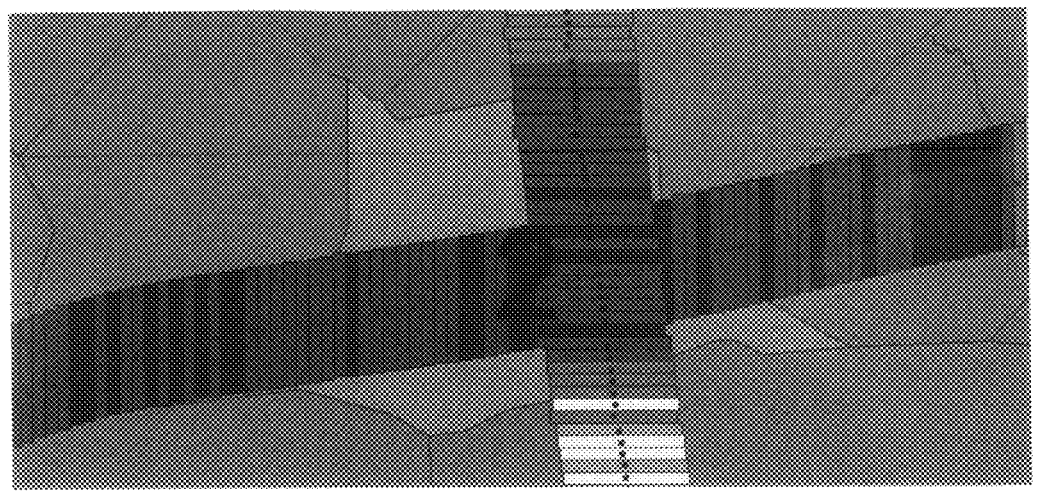
FIG. 15 shows another method of demonstrating the results of a biomass or carbon survey for Site 2.

FIGS. 7-15 show data and graphics that have been extracted and displayed for one of the thirty sites surveyed during the Mission to the Weyerhaeuser pine plantations in North Carolina. The site selected for FIGS. 7-14 is the Weyerhaeuser Site 19, and the site selected for FIG. 15 is Weyerhaeuser Site 2.

Figure 7:
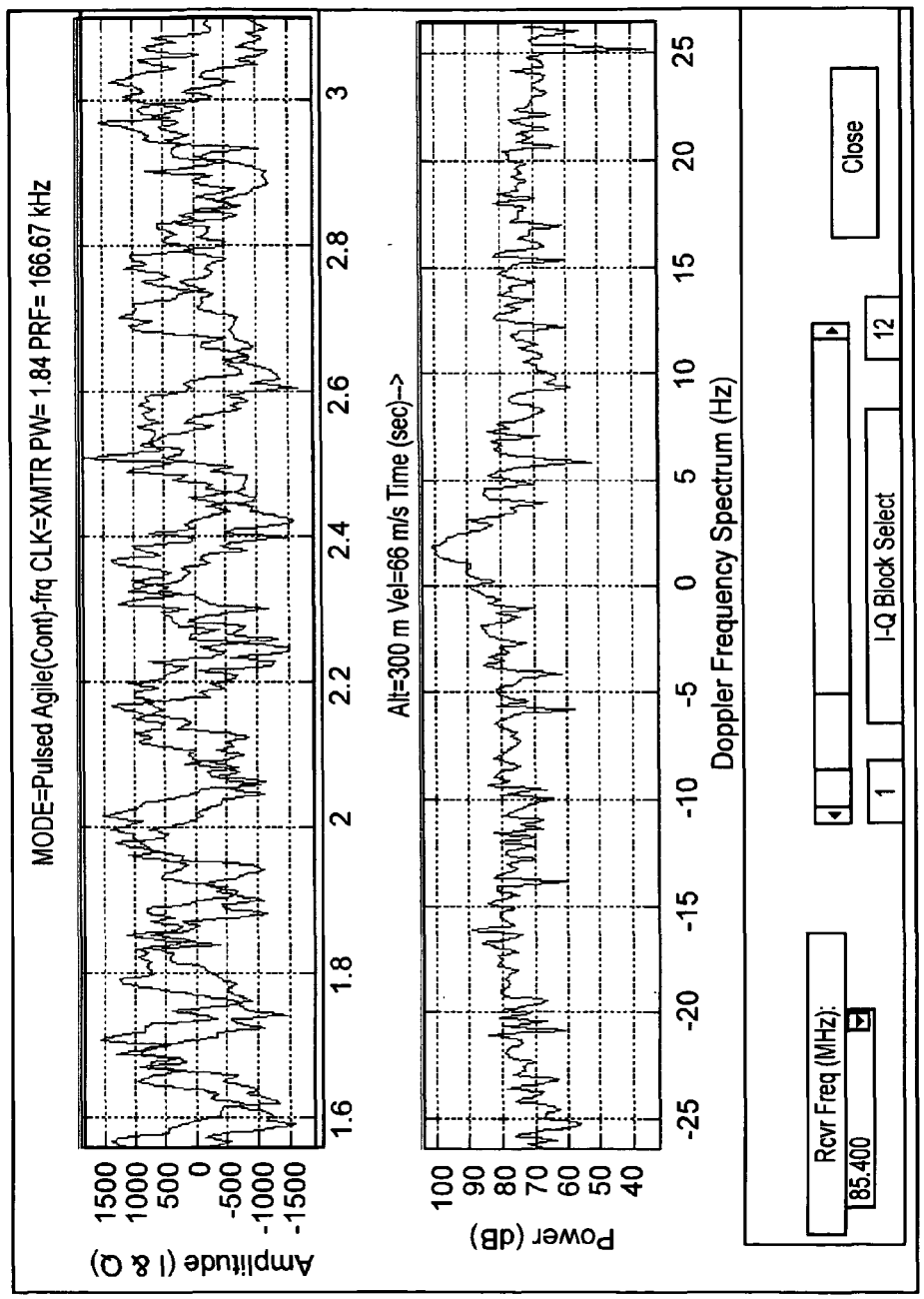
FIG. 7 shows about 1.5 seconds of the raw data taken over Weyerhaeuser Site 19.

FIG. 7 shows about 1.5 seconds of the raw data taken over Weyerhaeuser Site 19. The sample shown contains about 60,000 data points. The top window shows the magnitudes of the output of the radar I and Q channels. The magnitude is shown on the Y axis and time is shown on the X axis. Approximately 60 seconds of data was taken for each data pass. This data represents the magnitude of the returned radar energy from the trees. The sample rate is 166,000 samples (radar pulses) per second.

The bottom window shows the Doppler shifted frequency data observed resulting from the motion of the aircraft and extends from +/−50 Hz which is the Doppler bandwidth for the system. The Doppler shifts are used with a bank of 64 Doppler filters to array the data in the 5 degree angle bins from front to rear.

Figure 8:
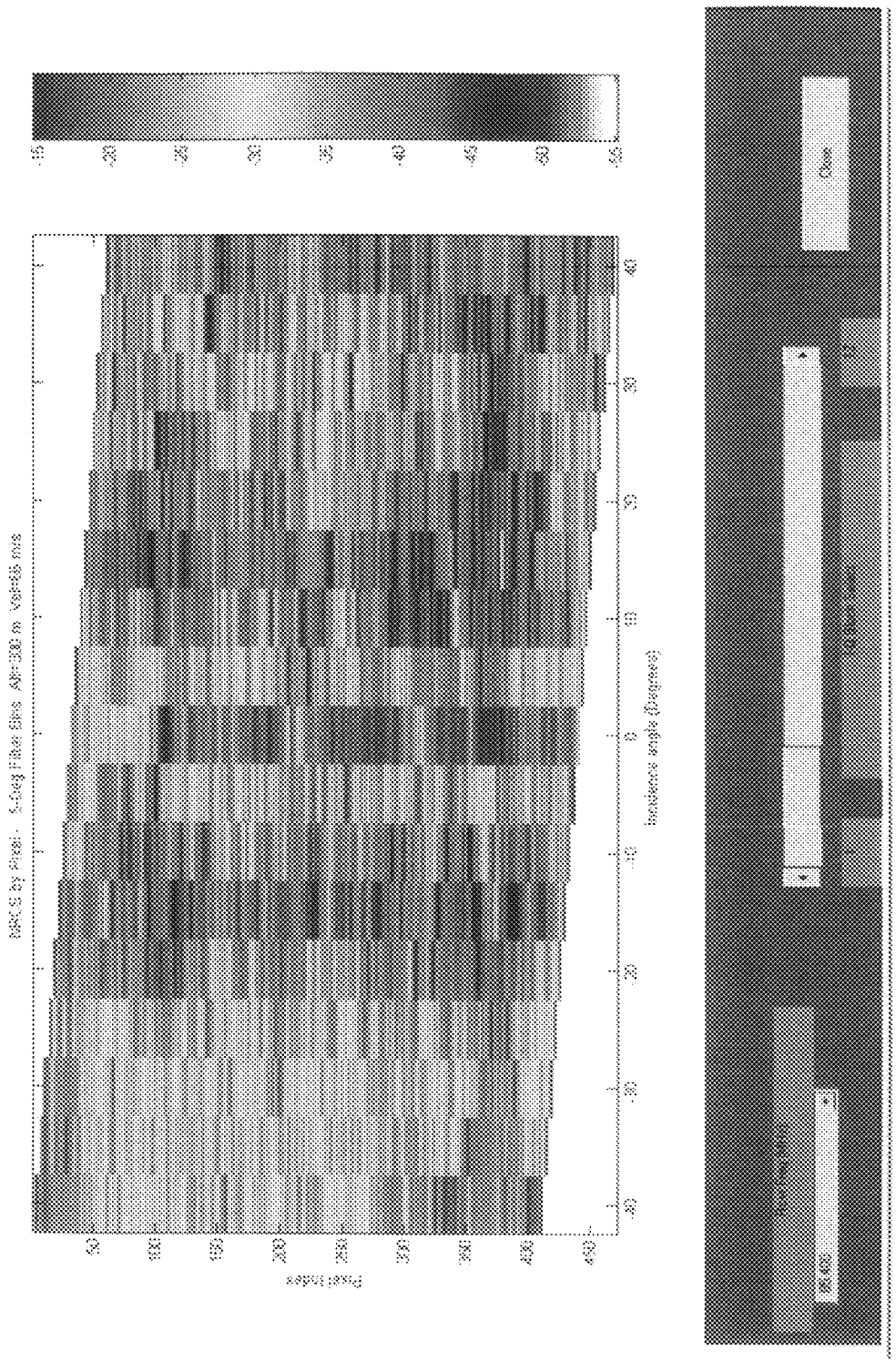
FIG. 8 displays the output of the digital filter bank and the algorithms which convert the data to Normalized Radar Cross Section (NRCS)

FIG. 8 displays the output of the digital filter bank and the algorithms which convert the data to Normalized Radar Cross Section (NRCS). The chart is color-coded to show the magnitude of the NRCS in dB. The Y axis represents the flight path of the aircraft as it flies from the bottom of the chart to the top. The X axis represents the magnitude of the returns sorted into the 5 degree angle bins. The positive Doppler shifts, or the data looking ahead of the aircraft, is shown to the right in the 5 degree angle bins. The negative Doppler shift, or the data seen by the radar looking to the rear, is shown to the left of the center. The actual aircraft track is down the center of this display down the center trace. The center trace, or the zero angle bin is the highest magnitude since it displays the reflected energy from directly underneath the aircraft. The data is skewed since it takes a finite amount of time for the aircraft to fly over each specific spot on the ground. A preferred embodiment sees the trees ahead first and the same trees astern last.

Figure 9:
FIG. 9 shows an aerial photograph of Weyerhaeuser Site 19.
Figure 10:
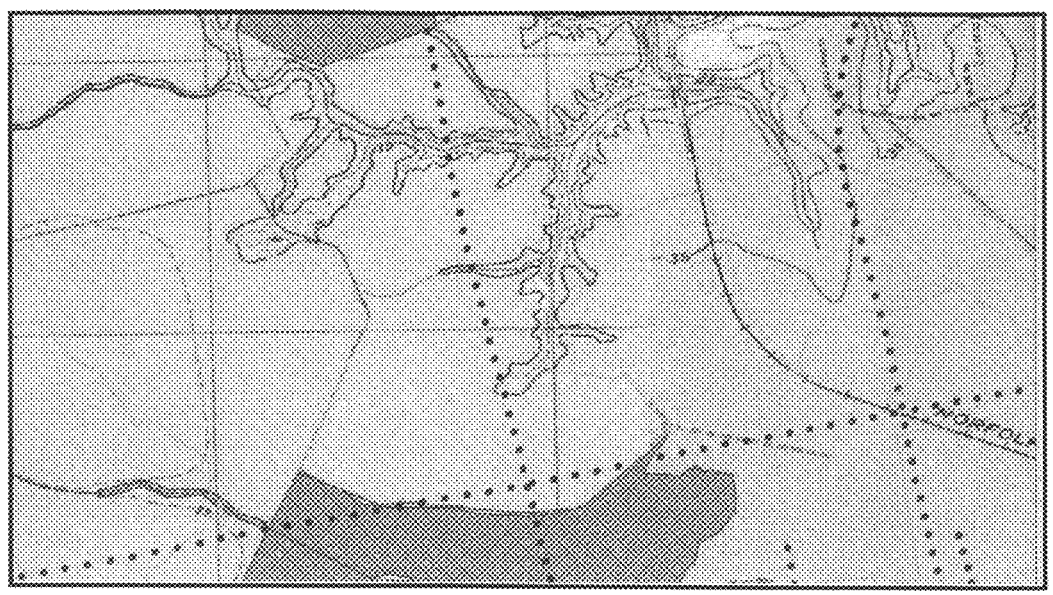
FIG. 10 shows the GPS/GIS flight paths over Site 19.
Figure 11:
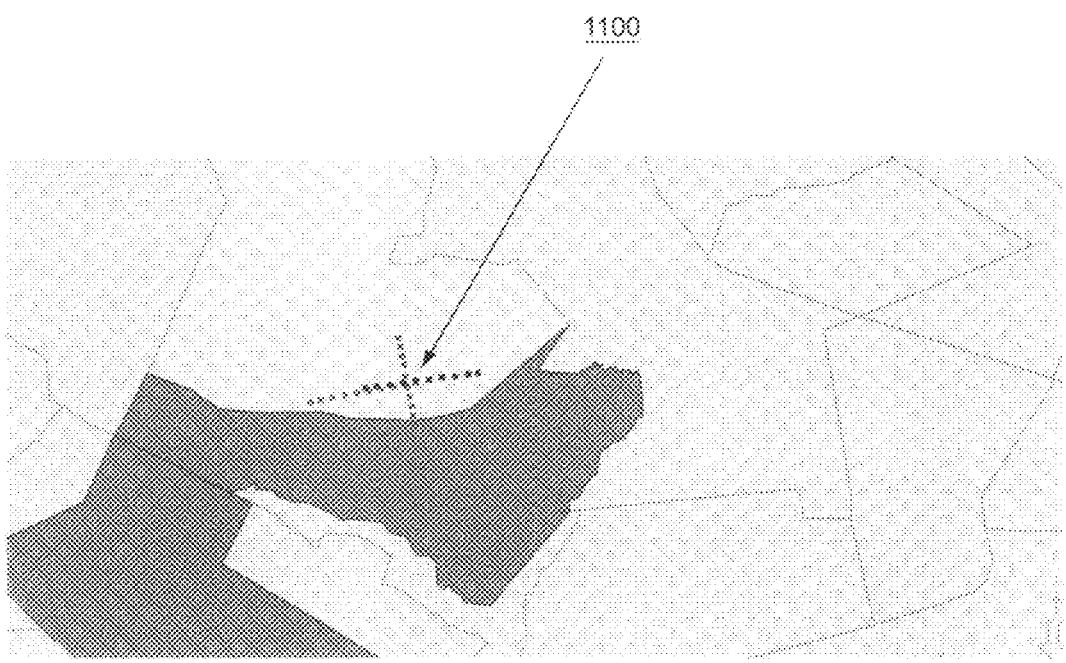
FIG. 11 shows the data points taken on three of the four runs for calculation of the site biomass.

FIG. 9 shows an aerial photograph of Weyerhaeuser site 19. The GPS/GIS flight paths over Site 19 are shown in FIG. 10. The north-south and east-west legs intersect in the southern portion of this site. Flight paths for other sites can be seen to the right. The GPS traces are skewed from true North and South since the pilots were using a magnetic compass which deviates from true north. FIG. 11 shows the data points 1100 taken on three of the four runs for calculation of the site biomass.

Figure 12:
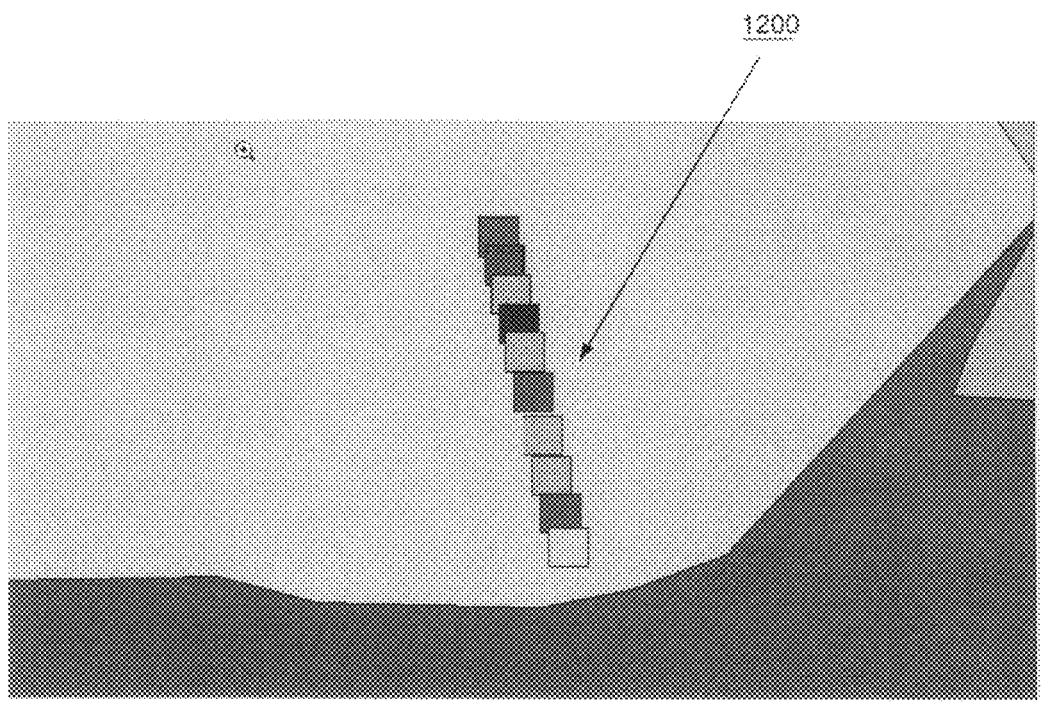
FIG. 12 shows the individual pixels or data points in GPS/GIS format.

The individual pixels or data points 1200 are shown in GPS/GIS format in FIG. 12. Ten data points are shown taken from Site 19 at the locations shown. The values for the site for four runs taken over the two days ranged from 175 to 200 tons per acre. The Weyerhaeuser-provided ground truth from 2003 was 160 tons per acre. In this view each pixel is 30×30 meters and is color coded to represent the value of biomass at that pixel location. The actual pixel is 30×300 meters. For each pixel, the time, GPS location, and the biomass and carbon in tons per acre or hectare is recorded and can be shown. The output format preferably is in the form of a GIS overlay that is used with standard ArcView software or a similar graphics software and/or hardware package. In FIG. 12, the 30×300 meter resolution cells are presented as 30×30 meter pixels.

FIG. 13 shows the reduction of the data to biomass in tons per hectare for the four passes over the site on two consecutive days. The left two green (upper) bars 1302a-b are from the first day, and the right two green (upper) bars 1304a-b are the results from the north-south and east-west legs on the second day. The Y axis shows the magnitude of the observed biomass. The thickness of the green bar demonstrates the spread of the averaged data. The ground truth shown is from July 2003. The experimentally observed ground truth for February 2005 brought the observations closer to the actual ground truth. The variations in the thickness of the green bars indicate the ranges of the data collected.

The results from the north-south and east-west passes compare very well, as do the magnitudes from one day to the next ($R^2 \approx 0.96$, as shown in FIG. 2A). It has been demonstrated that the measured biomass is reproducible. The observations above are compared to the recorded ground truth for July 2003, but the trees will have grown since then. These results demonstrate the feasibility of the improved BioSAR techniques.

FIG. 14 is one of the frames from the video camera aboard the aircraft taken over Site 19. The video camera preferably is collocated and collinear with the radar and the laser radar and has the same field of view (one preferred arrangement is shown in FIG. 4). Each video frame is annotated with GMT time and GPS location. It will be appreciated that any standardized time and location pairing may be used.

FIG. 15 shows another method of demonstrating the results of a biomass or carbon survey for Site 2. The dotted lines indicate the BioSAR 30 flight paths. Also shown in FIG. 15 are the 30×300 meter pixels which are color coded to indicate the level of biomass in tons per acre. Site 2 has about 180 tons per acre. The site immediately above has a lower biomass load level and the site immediately below Site 2 has been clear cut. The color of the pixels indicates the level of biomass.

The experience gained from these operational experiments provided the hardware and software modifications to the present design for the fabrication of a new instrument which will include a Synthetic Aperture Radar (SAR) component and a laser radar. This new system provides for a much more detailed survey through the use of multiple, overlapping, and orthogonal transects. The use of the new linear array antenna significantly reduces the size of the radar footprint on the ground and provides for improved accuracy. This new system conducts biomass and carbon surveys at a rate of 3 square miles per day. A major design goal of this new technique is the ability to observe a change in carbon of 1 ton per hectare per year.

Figure 16:
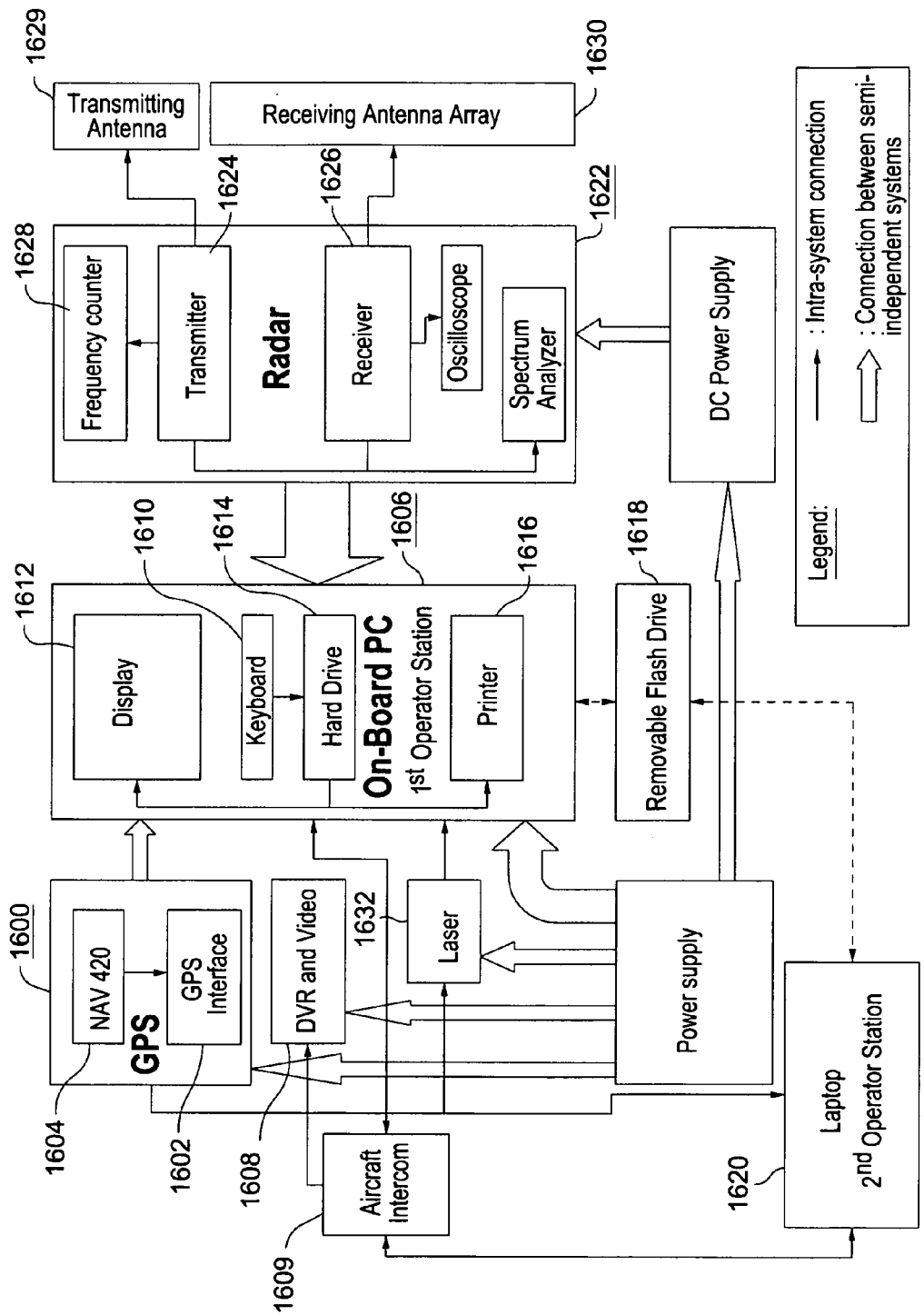
FIG. 16 is a block diagram for the fabrication of the improved BioSAR system.

FIG. 16 is a block diagram for the fabrication of the improved BioSAR system. FIG. 16 represents how the various subsystems and components are connected and communicate with each other. Each element is defined and discussed, starting from the left.

The Global Position System (GPS) Block 1600 consists of two elements, a GPS receiver 1602 and an inertial navigation system 1604 (e.g., a Crossbow NAV 420 Inertial Navigation System). The two systems are connected and provide a very accurate estimate of the aircraft in latitude, longitude, altitude, roll, pitch, and yaw. This data is output to the On-Board PC 1606, which timestamps the data and records it into a separate serial file.

A Digital Video Camera is collocated with the laser radar 1632 in a directly downlooking manner and observes the same field of view as the radar and the laser radar 1632 (as described with reference to FIG. 4). The output of the video camera is timestamped with the GMT time and recorded in a Digital Video Recorder (DVR) 1608 for playback to visually observe the target which the device is observing. The DVR also has an audio track onto which the conversations from the crew and the "On Top" marks are recorded (e.g. through a link with Aircraft Intercom 1609). It will be appreciated that the output may be timestamped with any time format, and that any video and audio recording format may be used together with, or in place of, a DVR.

The laser radar system 1632 looks through a large hole in the bottom of the Twin Otter fuselage and provides a very accurate measure of the Above Ground Level (AGL). This data is sent to the On-Board PC 1606, timestamped and preferably recorded in a separate serial file.

The System operator is located at a rack containing the On-Board PC 1606, a computer keyboard 1610 and display 1612, the system hard drive 1614, a printer 1616 to record data and screen shots and a series of USB2 ports for the high speed load of data onto 512 MB Thumb Drives (1618) for quality assessment and assurance after each flight. It will be appreciated that other ports, connectors, and/or storage mediums may be used and that the hardware configuration is exemplary and non-limiting. FIG. 2 shows one exemplary arrangement of the On-Board PC and associated equipment.

The second operator 1620, shown in the lower left hand corner of the Block Diagram, is the Crew Chief and assists in the visual identification of the sites to be surveyed and coordinates the actions and data taking of the cockpit crew and the crew. The Crew Chief takes the data from the System Operator downloaded to a thumb drive 1618 and uses it to input survey data into his laptop computer 1620. This computer preferably has all of the data reduction, analysis, and presentation algorithms for the near real time observations of the content and quality of the survey data. FIG. 5 shows one exemplary arrangement of the second operator station and associated equipment.

The radar 1622 itself is comprised of the radar transmitter 1624 and receiver 1626 and the separate associated antennas (transmitting antenna 1629 and receiving antenna array 1630, respectively), and several pieces of test gear for calibration and real time monitoring of the system. The transmitter 1624 preferably transmits the ~2 microsecond pulse through an antenna similar to the existing antenna. The exact frequency of the transmitted pulse is monitored and recorded constantly with an onboard frequency counter 1628. The transmitted power is monitored constantly with a sensitive power meter and recorded. The receiver 1626 receives the returned energy from the trees being surveyed through the new linear array antenna 1630 that extends from wingtip to wingtip on the aircraft (shown below in FIG. 18).

The survey data preferably is logged onto the hard drive 1614 of the PC with separate serial timestamped files for the radar data (I and Q channels), GPS position (Lat., Long., Alt.), GMT time, roll, pitch, yaw, and laser radar altitude and laser radar tree height. Video data preferably is recorded and time stamped with GMT. The radar, laser radar, and video camera preferably are collocated, collinear, and have the same field of view.

One preferred laser radar system that can be used with the techniques disclosed herein is the RIEGL Model LD90-3800VHS-FLP, which has the following specifications:

Distance range –10 meter to 750 meters to an 80% reflective target

Measuring speed programmable up to 2000 Hz, user selectable

Accuracy less than +/–5 cm

Beam Divergence of 1.6×1.8 mrad

FDA Class IIIb Laser

Operating wavelength 900 nm

Programmable for unit change

Footprint of 0.48×0.54 msq area at 300 m 4.4 kg with dimensions 232×184×100 mm

Operating temperature –10 to +50 degrees C.; storage temp –20 to +60 degrees C.

Continuous Signal Outputs by serial RS232/RS-422 with 50 mm Resolution

First and Last pulse data

The laser radar preferably is installed in a down looking position collocated with the digital video camera such that the video camera, the laser radar, and the BioSAR radar preferably are collinear with the same field of view. This laser system is eye safe to persons on the ground when the aircraft is at the operational altitude of 1000 feet. The laser radar records Above Ground Level (AGL) and tree height. The resulting data is sent to and stored in a separate serial file in the On-Board PC.

More specifically, the PALS system takes two types of laser measurements from which it derives tree height and estimates biomass. The first measurement is the distance to the ground, and the second measurement is the distance to the tree top. The subtraction of the second measurement from the first yields the tree height.

During flight, the PALS system records the airplane's height above ground level (AGL) and the height from the top of the forest's canopy in real time at a rate of approximately 400 to 2000 times per second. The PALS height data is interleaved with GPS date/time and latitude/longitude in synchrony with the radar data. During the radar data post-processing, the synchronous GPS information is used to link the height AGL to the radar returns to provide the range component of the radar equation, converting raw measurements to normalized cross section. The normalized cross section returns are later converted to biomass.

The PALS system also derives biomass from the transect plots of tree height. The contour of those transects and select sample measurements on the ground are used to derive laser biomass estimates. Again, using the synchronous GPS date/time of the radar and laser measurements, the two data sets are matched for a comparative study. The PALS biomass measurements are interpolated and used in a regression algorithm to correct for any possible fluctuation of the radar data that might be related to effects that would affect only the radar system (such as, for example, the close proximity of an FM transmitter at the time of the measurements, the proximity of roads and building structures that might act as reflectors within the radar's footprint, etc.). Conversely, the BioSAR data interpolation is used in a regression algorithm to correct the laser data for any fluctuation that may affect only the laser system (such as, for example, the presence of fog, inclement weather, etc.).

While it is preferable to use the PALS system to capture AGL and canopy height and to calculate a laser biomass estimate, the present invention is not so limited. On the contrary, any laser radar system capable of measuring such data and any processor capable of executing a biomass-related algorithm may be substituted in place of the PALS system.

Figure 17:
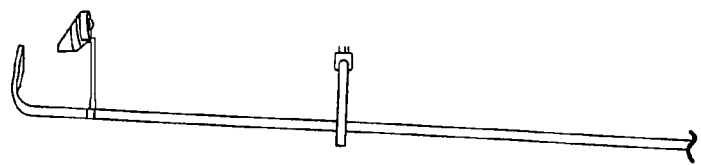
FIG. 17 shows how each element in a linear array antenna is constructed in the shape of a bent wire.
Figure 18:
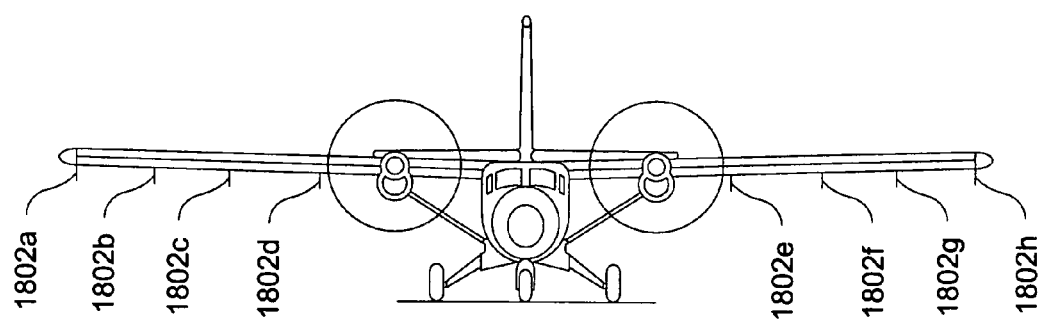
FIG. 18 shows a linear array positioned on a Twin Otter aircraft.

A new linear array antenna has been designed for installation on the Twin Otter aircraft. The array comprises a plurality of separate antennas (e.g. 7-9 separate antennas) mounted on the underside of the wing and the fuselage. Each element is in the shape of a bent wire as shown in FIG. 17. Four elements are installed under each wing (1802a-d and 1802e-h in FIG. 18) with the ninth element (not shown in FIG. 18) installed on the bottom of the fuselage. The array extends from wingtip to wingtip as shown in FIG. 18. With the current antenna, the earlier BioSAR radar footprint on the ground has an across track dimension of about 2000 feet. With the new array antenna, the across track dimension of the radar footprint will be reduced to about 300 feet to allow for higher accuracy and a smaller resolution cell or pixel.

The resulting specifications for the resolution cell or pixel size of the raw radar footprint and the finished pixel after Doppler processing for both BioSAR embodiments in accordance with the instant invention and a BioSAR device using the earlier method are shown in Table 1. The abbreviation ALT stands for Along Track, the dimension along which the aircraft flies. The ACT stands for Across Track, the dimension perpendicular to the path of the aircraft. Especially of note are the differences in raw radar footprint and the processed pixel size. The older technique has a raw radar footprint of about 80 acres and a processed data pixel size of about 1 acre. The raw radar footprint has an area of about 13 acres with processed data pixel size about 0.2 acres in the instant invention.

TABLE 1

Current and Previous BIOSAR Specifications

| Parameter | Embodiments Disclosed Herein | Previous BioSAR Technique | Units |
|---|---|---|---|
| Altitude | 1000 | 1000 | ft |
| offset angle | 0 | 0 | degrees |
| slant range | 1000 | 1000 | ft |
| Aircraft Speed | 219 | 219 | ft/s |
| Antenna beamwidth ALT | 45 | 45 | degrees |
| Antenna beamwidth ACT | 8 | 45 | degrees |

TABLE 1-continued

Current and Previous BIOSAR Specifications

| Parameter | Embodiments Disclosed Herein | Previous BioSAR Technique | Units |
|---|---|---|---|
| Propagation Speed | 3.00E+08 | 3.00E+08 | m/s |
| Antenna footprint ALT | 2000 | 2000 | ft |
| Antenna footprint ACT | 281 | 2000 | ft |
| Illumination time | 9.13 | 9.13 | secs |
| pulse width | 1.5 | 1.5 | microsec |
| Signal Bandwidth | 0.667 | 0.667 | MHz |
| PRI | 6 | 6 | microsec |
| PRF | 166.7 | 166.7 | KHz |
| Resolution ACT | 281 | 1000 | ft |
| Resolution ALT | 31 | 31 | ft |
| Survey Area | 3 | 30 | sq. mile/day |

The fit coefficients of the biomass equation were altered in a preferred embodiment to produce better results for the purposes of the instant invention. Specifically, in a preferred embodiment, Rs=0.5; $a_1$=2.93; $a_2$=2.17; $a_3$=1.87; $a_4$=2.16; $a_5$=1.24; $a_6$=1.43; $b_1$=38.64; $b_2$=1.5; density=0.5; θ=inc_angle_radians; mk=2*π* radar_freq/300. Also, in a preferred embodiment, the frequency used was 85.4 mHz.

Figure 19:
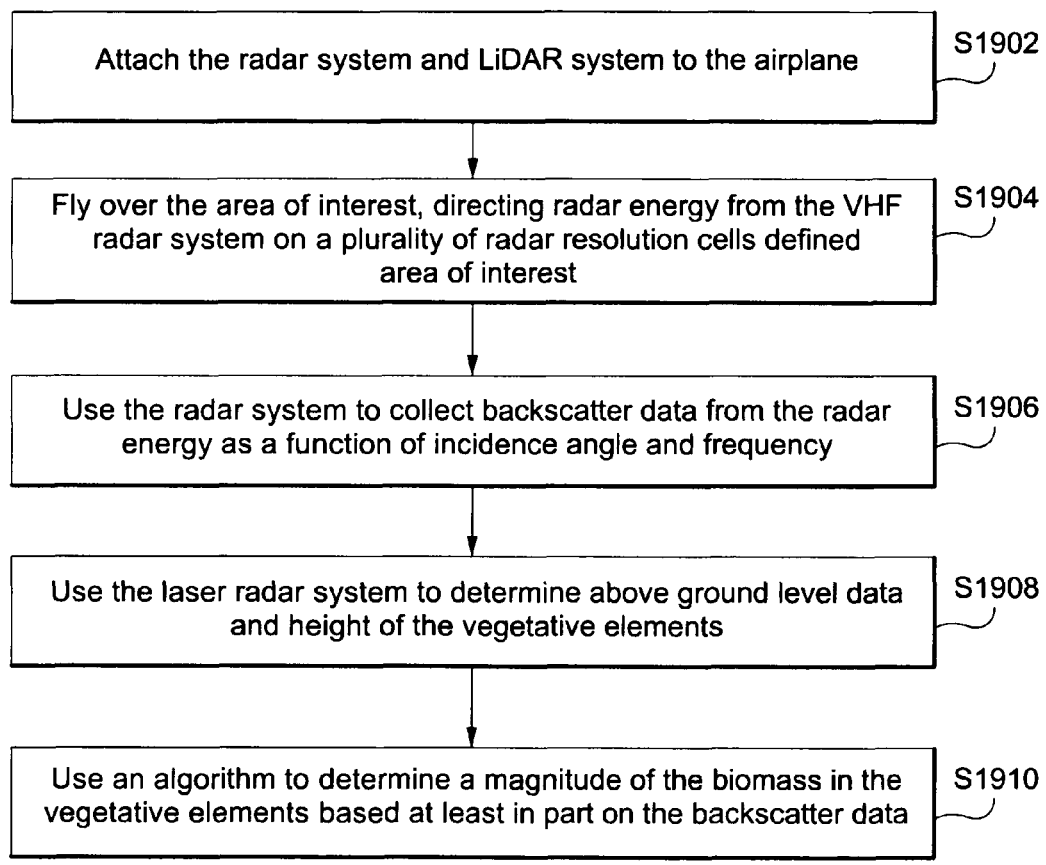
FIG. 19 is a flowchart showing an exemplary process for measuring the terrestrial biomass in the vegetative elements in an area of interest.

FIG. 19 is a flowchart showing an exemplary process for measuring the terrestrial biomass in the vegetative elements in an area of interest. In step S1902, the radar system and LiDAR system are attached to the airplane. Then, in step S1904, the airplane flies over the area of interest, directing radar energy from the VHF radar system on a plurality of radar resolution cells defined in the area of interest. The radar system collects backscatter data from the radar energy as a function of incidence angle and frequency in step S1906, and the laser radar system determines above ground level data and height of the vegetative elements in step S1908. In step S1910, an algorithm is used to determine a magnitude of the biomass in the vegetative elements based at least in part on the backscatter data.

It will be appreciated that the current single-frequency wingtip-to-wingtip antenna could be used in combination with the previous Johnson techniques. Similarly, it will be appreciated that the LiDAR system and associated circuitry described in connection with the instant invention could use a smaller BioSAR antenna described by the previous Johnson techniques.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of remote measurement of terrestrial biomass contained in vegetative elements present in an area of interest, the method comprising:
providing an airborne VHF radar system in combination with an airborne laser radar system;
overflying the area of interest while directing radar energy from the VHF radar system toward the area of interest, wherein a plurality of radar resolution cells are defined on the area of interest;
using the VHF radar system to collect backscatter data from the radar energy as a function of incidence angle and frequency for each of the plurality of given radar resolution cells in the area of interest;
using the laser radar system to determine above ground level data and height of the vegetative elements in each of the plurality of radar resolution cells; and,
determining a magnitude of the biomass in the vegetative elements based at least in part on the backscatter data and data from the laser radar system for each of the plurality of radar resolution cells in the area of interest.

2. The method of claim 1, wherein the VHF radar system and the laser radar system are operably connected to an airplane having two wings, with each wing having a wingtip, and further wherein the VHF radar system extends from wingtip-to-wingtip.

3. The method of claim 1, wherein the VHF radar system operates on a single frequency.

4. The method of claim 1, further comprising generating a map of the area of interest, the map showing at least the magnitude of the biomass of the vegetative elements as a function of location.

5. The method of claim 1, further comprising recording video and/or audio while overflying the area of interest.

6. A method of remote measurement of terrestrial biomass contained in vegetative elements present in an area of interest, the method comprising:
providing an airborne VHF radar system in combination with a laser radar system, the VHF radar system comprising a linear antenna array;
overflying the area of interest while directing radar energy from the VHF radar system toward the area of interest, wherein a plurality of radar resolution cells are defined on the area of interest;
using the VHF radar system to collect backscatter data from the radar energy as a function of incidence angle and frequency for each of the plurality of given radar resolution cells in the area of interest;
using the laser radar system to determine above ground level data and height of the vegetative elements in each of the plurality of radar resolution cells; and,
determining a magnitude of the biomass in the vegetative elements based at least in part on the backscatter data and data from the laser radar system for each of the plurality of radar resolution cells in the area of interest.

7. The method of claim 6, wherein the linear array antenna comprises 7-9 antennas.

8. The method of claim 6, wherein each antenna in the linear array antenna operates on a single predetermined frequency.

9. The method of claim 6, further comprising generating a map of the area of interest, the map showing at least the magnitude of the biomass of the vegetative elements as a function of location.

10. The method of claim 6, further comprising recording video and/or audio while overflying the area of interest.

11. A system for remote measurement of terrestrial biomass contained in vegetative elements present in an area of interest, comprising:
a VHF radar system operable to be connected to an airborne object in a down-looking manner, the VHF radar system being further operable to direct radar energy toward the area of interest and to collect backscatter data from the radar energy as a function of incidence angle and frequency for each of a plurality of radar resolution cells defined on the area of interest;
an airborne laser radar system operable to be connected to an airborne object in the down-looking manner, the airborne laser radar system being further operable to measure above ground level data and height of the vegetative elements in each of the plurality of radar resolution cells; and, a processor operable to determine a magnitude of the biomass in the vegetative elements based at least in part on the backscatter data and data from the laser radar system for each of the plurality of radar resolution cells in the area of interest.

12. The system of claim 11, wherein the airborne object is an airplane having two wings with each wing having a wingtip, and further wherein the VHF radar system extends from wingtip-to-wingtip on the airplane.

13. The system of claim 11, wherein the VHF radar system operates on a single frequency.

14. The system of claim 11, wherein the processor is further operable to generate a map of the area of interest, the map showing at least the magnitude of the biomass of the vegetative elements as a function of location.

15. The system of claim 11, further comprising a recorder operable to record video of the area of interest and/or audio.

16. The system of claim 11, wherein the VHF radar system and the laser radar system are disposed so as to be collacted and collinear, and/or have the same field of view.

17. The system of claim 15, wherein the VHF radar system, the laser radar system, and/or the recorder are disposed so as to be collacted and collinear, and/or have the same field of view.

18. A system for remote measurement of terrestrial biomass contained in vegetative elements present in an area of interest, comprising:

a VHF radar system operable to be connected to an airborne object in a down-looking manner, the VHF radar system being further operable to direct radar energy toward the area of interest and to collect backscatter data from the radar energy as a function of incidence angle and frequency for each of a plurality of radar resolution cells defined on the area of interest;

an airborne laser radar system operable to be connected to an airborne object in the down-looking manner, the airborne laser radar system being further operable to measure above ground level data and height of the vegetative elements in each of the plurality of radar resolution cells; and, a processor operable to determine a magnitude of the biomass in the vegetative elements based at least in part on the backscatter data and data from the laser radar system for each of the plurality of radar resolution cells in the area of interest;

wherein the VHF radar system comprises a linear antenna array.

19. The system of claim 18, wherein the linear array antenna comprises 7-9 antennas.

20. The system of claim 18, wherein each antenna in the linear array antenna operates on a single predetermined frequency.

21. The system of claim 18, wherein the processor is further operable to generate a map of the area of interest, the map showing at least the magnitude of the biomass of the vegetative elements as a function of location.

22. The system of claim 18, further comprising a recorder operable to record a video of the area of interest and/or audio.

23. The system of claim 18, wherein the VHF radar system and the laser radar system are disposed so as to be collacted and collinear, and/or have the same field of view.

24. The system of claim 23, wherein the VHF radar system, the laser radar system, and/or the recorder are disposed so as to be collacted and collinear, and/or have the same field of view.

* * * * *